(12) United States Patent
Shen et al.

(10) Patent No.: US 7,704,483 B2
(45) Date of Patent: Apr. 27, 2010

(54) HIGH SURFACE AREA TETRAGONAL ZIRCONIA AND PROCESSES FOR SYNTHESIZING SAME

(75) Inventors: Jian-Ping Shen, Albuquerque, NM (US); Qi Fu, Albuquerque, NM (US); Jian Zheng, Albuquerque, NM (US); Paolina Atanassova, Albuquerque, NM (US); Mark J. Hampden-Smith, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 1032 days.

(21) Appl. No.: 11/117,708

(22) Filed: Apr. 29, 2005

(65) Prior Publication Data

US 2006/0245999 A1  Nov. 2, 2006

(51) Int. Cl.
*C01G 25/02*  (2006.01)
*C01G 11/02*  (2006.01)
*C01F 17/00*  (2006.01)

(52) U.S. Cl. ............ 423/608; 423/594.12; 423/594.16; 423/263; 423/593.1

(58) Field of Classification Search ................. 423/608, 423/594.12, 594.16, 263, 593.1
See application file for complete search history.

(56) References Cited

U.S. PATENT DOCUMENTS

| | | | |
|---|---|---|---|
| 4,791,091 A * | 12/1988 | Bricker et al. ............... | 502/303 |
| 4,985,229 A | 1/1991 | Obitsu et al. | |
| 5,100,509 A | 3/1992 | Pisecky et al. | |
| 5,498,446 A | 3/1996 | Axelbaum et al. | |
| 5,615,493 A | 4/1997 | Funder | |
| 5,958,361 A | 9/1999 | Laine et al. | |
| 6,051,330 A * | 4/2000 | Fasano et al. ................. | 429/30 |
| 6,103,393 A | 8/2000 | Kodas et al. | |
| 6,150,299 A | 11/2000 | Umemoto et al. | |
| 6,214,306 B1 | 4/2001 | Alubert et al. | |
| 6,228,794 B1 | 5/2001 | Jordan et al. | |
| 6,248,216 B1 | 6/2001 | Bi et al. | |
| 6,255,242 B1 | 7/2001 | Umemoto et al. | |
| 6,306,794 B1 | 10/2001 | Suzuki et al. | |
| 6,338,809 B1 | 1/2002 | Hampden-Smith et al. | |
| 6,689,192 B1 | 2/2004 | Phillips et al. | |

(Continued)

FOREIGN PATENT DOCUMENTS

EP    0716883 B1    6/1996

(Continued)

OTHER PUBLICATIONS

Sirarat Kongwudthiti, Piyasan Praserthdam, Peter Silveston, Masahi Inoue, "Influence of synthesis conditions on the preparation of zirconia powder by the glycothermal method" Ceramics International 29 (2003) pp. 807-814.*

(Continued)

*Primary Examiner*—Ngoc-Yen M Nguyen
*Assistant Examiner*—Diana J Liao

(57) ABSTRACT

A zirconia-containing composition and processes for synthesizing same. The composition comprises least about 99.9 percent tetragonal phase zirconia, based on the total crystalline zirconia in the zirconia-containing composition as determined by x-ray diffraction (XRD). The composition also has a substantially spherical morphology and comprises less than 100 wppm chlorine, based on the total weight of the zirconia-containing composition. The zirconia-containing composition has an average surface area of at least 80 m²/g and an average particle size of less than about 10 microns.

13 Claims, 2 Drawing Sheets

U.S. PATENT DOCUMENTS

| | | |
|---|---|---|
| 2003/0054218 A1 | 3/2003 | Hampden-Smith et al. |
| 2003/0108664 A1 | 6/2003 | Kodas et al. |
| 2003/0113254 A1 | 6/2003 | Belov et al. |
| 2003/0124259 A1 | 7/2003 | Kodas et al. |
| 2003/0148024 A1 | 8/2003 | Kodas et al. |
| 2003/0161959 A1 | 8/2003 | Kodas et al. |
| 2003/0180451 A1 | 9/2003 | Kodas et al. |
| 2003/0224931 A1 | 12/2003 | Yamamoto et al. |
| 2003/0232235 A1 | 12/2003 | Gorer et al. |
| 2004/0007531 A1 | 1/2004 | Bortun et al. |
| 2004/0028589 A1 | 2/2004 | Reisinger et al. |
| 2004/0038808 A1 | 2/2004 | Hampden-Smith et al. |
| 2004/0175327 A1 | 9/2004 | Hagemeyer et al. |
| 2004/0179994 A1 | 9/2004 | Fenouil et al. |
| 2005/0112056 A1 | 5/2005 | Hampden-Smith et al. |
| 2006/0051288 A1 | 3/2006 | Tsurumi et al. |
| 2006/0148950 A1 | 7/2006 | Davidson et al. |

FOREIGN PATENT DOCUMENTS

| | | |
|---|---|---|
| WO | WO 03/032084 A2 | 4/2003 |

OTHER PUBLICATIONS

Masashi Inoue, Keiichiro Sato, Tomohiro Nakamura and Tomoyuki Inui, "Glycothermal synthesis of zirconia-rare earth oxide solid solutions" Catalysis Letters 65 (2000) pp. 79-83.*

Abe, Fujio et al., "Tetragonal to monoclinic transformation and microstructural evolution in $ZrO_2$-9.7 mol% MgO during cyclic heating and cooling," *Journal of Materials Science* 32, pp. 513-522 (1997).

Agrafiotis Christos et al., "Effect of Slurry Rheological Properties on the Coating of Ceramic Honeycombs with Yttria-Stabilized-Zirconia Washcoats, "*J. Am. Ceram. Soc.* 83 [5], pp. 1033-1038 (2000).

Aguilar, D.H. et al., "A Study of the Crystallization of $ZrO_2$ in the Sol-Gel System: $ZrO_2$-$SiO_2$," *Journal of Solid State Chemistry* 158, pp. 349-357 (2000).

Ai, Desheng et al., "Synthesis of 3Y-$ZrO_2$ nano-powders via a W/O emulsion," *Ceramics International* xxx (2004) xxx-xxx, pp. 1-5.

Alifanti, M. et al.,"Characterization of $CeO_2$-$ZrO_2$ Mixedc Oxides. Comparison of the Citrate and Sol-Gel Preparation Methods," *Chem. Mater.* 15, pp. 395-403, 2003.

Amenomiya, Y., "Methanol Synthesis from $CO_2$ + $H_2$, II. Copper-Based Binary and Ternary Catalysts$^a$," *Applied Catalysis* 30, pp. 57-68, (1987).

Antou, Guy et al., "Evaluation of modifications induced on pore network and structure of partially stabilized zirconia manufactured by hybrid plasma spray process," *Surface & Coatings Technology* 180-181, pp. 627-632, (2004).

Arata, Kazushi et al., "Expoxide Rearrangement III.[1]) Isomerization of 1-Methylcyclohexene Oxide over $TiO_2$-$ZrO_2$, $NiSO_4$ and $FeSO_4$," *Bulletin of the Chemical Society of Japan*, vol. 49(2), pp. 390-393, (1976).

Arata, Kazushi et al., "Expoxide Rearrangement IV.[1]) Isomerization of Cyclohexene and 1-Methyl-cyclohexene Oxides over Solid Acids and Bases in Gas Phase," *Bulletin of the Chemical Society of Japan*, vol. 49(2), pp. 563-564, (1976).

Arata, Kazushi et al., "Solid Superacids", *Advances in Catalysis* vol. 37, pp. 165-211 (1990).

Arico, A.S. et al., "An XPS study on oxidation states of Pt and its alloys with Co and Cr and its relevance to electroreduction of oxygen", *Applied Surface Science* 172, pp. 33-40 (2001).

Bak, Tadeusz et al., "Grain Boundary Diffusion of Magnesium in Zirconia," *J. Am. Ceram. Soc.* 85 [9], pp. 2344-2350 (2002).

Barbéris, Pierre et al., "Raman spectra of tetragonal zirconia: powder to zircaloy oxide frequency shift," *Journal of Nuclear Materials* 288, pp. 241-247, (2001).

Basu, Bikramjit et al., "Microstructure-toughness-wear relationship of tetragonal zirconia ceramics," *Journal of the European Ceramic Society* 24, pp. 2031-2040, (2004).

Basu, Bikramjit et al, "Transformation behaviour of tetragonal zirconia: role of dopant content and distribution," *Materials Science and Engineering* A366, pp. 338-347 (2004).

Bechepeche, A.P. et al., "Experimental and theoretical aspects of the stabilization of zirconia," *Journal of Materials Science* 34 pp. 2751-2756, (1999).

Benfer, Sigrid et al., Structure, morphology and surface properties of nanostructured $ZrO_2$ particles, *J. Mater. Chem.* 9, pp. 1203-1209 (1999).

Benyagoub, A., "Evidence of an ion-beam induced crystalline-to-crystalline phase transformation in hafnia,"*Eur. Phys. J. B* 34, pp. 395-398 (2003).

Bhatia, Tania et al., "Mechanisms of ceramic coating deposition in solution-precursor plasma spray," *J. Mater. Res.* vol. 17, No. 9, pp. 2363-2372, (Sep. 2002).

Bird, et al., "Reactions of Alkenes and the Equilibration of Hydrogen and Deuterium on Zirconia, "*J. Chem. Soc.*, Faraday Trans. 1, 83 (9), pp. 3069-3082 (1987).

Bocanegra-Bernal, M.H. et al., "Phase transitions in zirconium dioxide and related materials for high performance engineering ceramics," *Journal of Materials Science* 37, pp. 4947-4971, (2002).

Bokhimi, Xim et al., "Hydrolysis, Condensation, and Tetragonal Phase Formation in Sol-Gel Zirconia Prepared with Electron-Irradiated Alkoxide Solutions," *Journal of Sol-Gel Science and Technology* 17, pp. 219-225 (2000).

Bolis, Vera, et al., "Effect of sulfation on the acid-base properties of tetragonal zirconia. A calorimetric and IR spectroscopic study," *Topics in Catalysis* vol. 19., Nos. 3-4, pp. 259-269, May 2002.

Bondioli, Federica et al., "Microwave-Hydrothermal Synthesis of Nanocrystalline Zirconia Powders, "*J. Am. Ceram. Soc.* 84 [11], pp. 2728-2730 (2001).

Boschini, F. et al., "Preparation of nanosized barium zirconate powder by thermal decomposition of urea in an aqueous solution containing barium and zirconium, and by calcination of the precipitate," *Journal of the European Ceramic Society* 23, pp. 3035-3042, (2003).

Boukari, Hacène et al., "Small-angle neutron scattering study of the role of feedstock particle size on the microstructural behavior of plasma-sprayed yttria-stabilized zirconia deposits," *J. Mater. Res.* vol. 18, No. 3, pp. 624-634, Mar. 2003.

Bouvier, P. et al., "Zone center phonon frequencies in tetragonal zirconia: lattice dynamical study and new assignment proposition,"*Journal of Physics and Chemistry of Solids* 62, pp. 873-879 (2001).

Bouvier, P. et al., "Low Temperature phase transformation of nanocrystalline tetragonal $ZrO_2$ by neutron and Raman scattering studies," *International Journal of Inorganic Materials* 3, pp. 647-654 (2002).

Bouvier, P. et al., "The high-pressure phase sequence in nanocrystalline zirconia," *Eur. Phys.* J. B 35, pp. 301-309 (2003).

Bruce, et al., "The Activity of Cabalt-Zirconia and Cobalt-Nickel-Zirconia Preparations in the Fischer-Tropsch Reaction", *Applied Catalysis* 8, pp. 349-358, (1983).

Burton, Ian et al., "Optimisation of the Preparation of Ceria/Zirconia Mixed Oxides by a Statistical Approach," *MelChemicals* (unknown).

Bruce, L et al., *Appl. Catal.* 4, pp. 353 (1982) (copy unavailable).

Cairns, J.A. et al., "The Role of Zirconia Supported Pd/Zr Couple in Vehicle Exhaust Emission Control," MEL Chemicals, MELCat. Doc. 6190, pp. 1-6. (1997).

Cao, Yong, et al., "Characterization of high-surface-area zirconia aerogel synthesized from combined alcohothermal and supercritical fluid drying techniques," *Catalysis Letters* vol. 81, No. 1-2, pp. 107-112, (Jul. 2002).

Capel, F. et al., "Structure-electrical properties relationships in $TiO_2$-doped stabilized tetragonal zirconia ceramics," *Ceramics International* 25, pp. 639-648, (1999).

Capel, F. et al., "Structure and electrical behavior in air of $TiO_2$-doped stabilized tetragonal zirconia ceramics," *Appl. Phys.* A 68, pp. 41-48 (1999).

Caracoche, Maria C. et al., "Zirconium Oxide Structure Prepared by the Sol-Gel Route: I, The Role of the Alcoholic Solvent," *J. Am. Ceram. Soc.* 83 [2], pp. 327-384 (2000).

Carrascull, Alfredo L. et al., "Catalytic Combustion of Soot on KNO₃/ZrO₂ Catalysts. Effect of Potassium Nitrate Loading on Activity," *Ind. Eng. Chem. Res.* 42, pp. 692-697 (2003).

Chadwick, A. et al., "Solid-State NMR and X-ray Studies of the Structural Evolution of Nanocrystalline Zirconia," *Chem. Mater* 13, pp. 1219-1229 (2001).

Chang, Hsiao-Lan et al., "Effect of Sodium on Crystallite Size and Surface Area of Zirconia Powders at Elevated Temperatures," *J. Am. Ceram. Soc.* 83 [9], pp. 2055-2061 (2000).

Chien, F. R. "Stress-Induced Martensitic Transformation and Ferroelastic Deformation Adjacent Microhardness Indents in Tetragonal Zirconia Single Crystals," *Acta Mater.* vol. 46 No. 6, pp. 2151-2171 (1998).

Chuah, G.K. et al., "The preparation of high surface area zirconia—Influence of precipitating agent and digestion," *Applied Catalysis A: General* 163, pp. 261-273 (1997).

Chuah, G.K. et al., "The Preparation of High-Surface-Area Zirconia II. Influence of Precipitating Agent and Digestion on the Morphology and Microstructure of Hydrous Zirconia," *Journal of Catalysis* 175, pp. 80-92, Article No. CA981980 (1998).

Chuah, G.K. "An investigation into the preparation of high surface area zirconia," *Catalysis Today* 49, pp. 131-139, (1999).

Chuah, G.K. et al., "High surface area zirconia by digestion of zirconium propoxide at different pH," *Microporous and Mesoporous Materials* 39, pp. 381-392 (2000).

Chung, Tai-Joo et al., "Morphology and Phase Stability of Nitrogen-Partially Stabilized Zirconia (N-PSZ)," *J. Am. Ceram. Soc.* 84 [1], pp. 172-178 (2001).

Collins, David E. et al., "Crystallization of Metastable Tetragonal Zirconia from the Decomposition of a Zirconium Alkoxide Derivative," *Journal of the European Ceramic Society* 15, pp. 1119-1124 (1995).

Collins, David E. et al., "Influence of atmosphere on crystallization of zirconia from a zirconium alkoxide," *J. Mater. Res.*, vol. 13 No. 5, pp. 1230-1237 (May 1998).

Cordischi, Dante et al., "EPR Study of Mo$^V$ in the Tetragonal and Monoclinic Phases of Zirconia," *Journal of Solid State Chemistry* 136, pp. 263-268 (1998).

Córdova-Matinez, W. et al., "Nanocrystalline tetragonal zirconium oxide stabilization at low temperatures by using rare earth ions: Sm$^{3+}$ and Tb$^{3+}$," *Optical Materials* 20, pp. 263-271 (2001).

Corradi, Anna Bonamartini et al., "Role of Praseodymium on Zirconia Phases Stabilization," *Chem. Mater.* 13, pp. 4550-4554 (2001).

Czeppe, Tomasz et al., "Crystallographic and microchemical characterization of the early stages of eutectoid decomposition in MgO-partially stabilized ZrO₂," *Journal of the European Ceramic Society* 22, pp. 35-40 (2002).

Czeppe, T. et al., "Microstructure and phase composition of ZrO₂-MgO structural ceramic after high-temperature deformation," *Materials Chemistry and Physics* 81, pp. 312-314 (2003).

Daturi, Marco et al., "Reduction of High Surface Area CeO₂-ZrO₂ Mixed Oxides" *J. Ohys. Chem. B* 104, pp. 9186-9194 (2000).

Davis, Burton H. et al., "Catalytic Conversion of Alcohols. 11. Influence of Preparation and Pretreatment on the Selectivity of Zirconia", *Ind. Eng. Chem. Prod. Res. Dev.* 18, No. 3, pp. 191-198 (1979) (copy unavailable).

del Monte, Francisco et al., "Chemical Interactions Promoting the ZrO₂ Tetragonal Stabilization in ZrO₂-SiO₂ Binary Oxides" *J. Am. Ceram. Soc.* 83 [6], pp. 1506-1512 (2000).

Delachaux, T. et al., "Nitriding of tetragonal zirconia in a high current d.c. plasma source," *Thin Solid Films* 425, pp. 113-116 (2003).

Denise, B. et al., "Oxide-Supported Copper Catalysts prepared from Copper Formate: Differences in Behavior in Methanol Synthesis for CO/H₂ and CO₂/H₂ Mixtures", *Applied Catalysis* 28, pp. 235-239 (1986).

Dias, Anderson et al., "Electroceramic Materials of Tailored Phase and Morphology by Hydrothermal Technology," *Chem. Mater.* 15, pp. 1344-1352 (2003).

Djuričić, B. et al., "The Properties of Zirconia Powders Produced by Homogeneous Precipitation," *Ceramics International* 21, pp. 195-206 (1995).

Dodd, A.C. et al., "Solid-State Chemical Synthesis of Nanoparticulate Zirconia," *Acta Mater.* 49, pp. 4215-4220 (2001).

Du, Yong et al., "Measurement and Calculation of the ZrO₂-CeO₂-LaO₁.₅ Phase Diagram," *Calphad* vol. 20, No. 1, pp. 95-108 (1996).

El-Shobaky, G.A. et al., "Effects of ZrO₂-doping of a CuO/MgO system on its surface and catalytic properties," *Colloids and Surfaces A: Physicochem. Eng. Aspects* 211, pp. 1-8 (2002).

Eley, D.D. et al., "Solid Superacids," *Advances in Catalysis* vol. 37, pp. 165-211, (1990).

Enomoto, Naoya et al., "Process study on alumina-zirconia nanocomposite *via* ammonolysis route," *Journal of Ceramic Processing Research* vol. 1, No. 2, pp. 88-91 (2000).

Freund, Andreas et al., "Improved Pt alloy catalysts for fuel cells", *Catalysis Today* 27, pp. 279-283 (1996).

Fuertes, M.C. et al., "Mechanochemical synthesis and thermal evolution of La$^{3+}$-ZrO₂ cubic solid solutions," *Ceramics International* xxx, pp. 1-6, (2004).

Fujitsu, Satoru et al., "Sintering of Partially Stabilized Zirconia by Microwave Heating Using ZnO-MnO₂-Al₂O₃ Plates in a Domestic Microwave Oven," *J. Am. Ceram. Soc.* 83 [8], pp. 2085-2086 (2000).

Gandhi, Ashutosh S. et al., "Dense Amorphous Zirconia-Alumina by Low-Temperature Consolidation of Spray-Pyrolyzed Powders," *J. Am. Ceram. Soc.* 82 [10], pp. 2613-2618 (1999).

Gao, L. et al., "Preparation of Ultrafine Zirconia Powder by Emulsion Method," *Journal of the European Ceramic Society* 16, pp. 437-440 (1996).

Gao, L. et al., "Phase transformation in the Al₂O₃-ZrO₂ system," *Journal of Materials Science* 33, pp. 1399-1403 (1998).

Gedanken, A. et al., "Sonochemical Preparation and Characterization of Europium Oxide Doped in and Coated on ZrO₂ and Yttrium-Stabilized Zirconium (YSZ)," *J. Phys. Chem. B* 104, pp. 7057-7065 (2000).

Geiculescu, A. Corina et al., "Atomic scale structure of alcohol-based zirconia xerogels by X-ray diffraction," *Journal of Non-Crystalline Solids* 289, pp. 53-61 (2001).

Geiculescu, A. Corina et al., "X-ray scattering studies of polymeric zirconium species in aqueous xerogels, "*Journal of Non-Crystalline Solids* 306, pp. 30-41 (2002).

Georgescu, Catalin et al., "Zirconia based nanomaterials," *Matérciaux*(2002) pp. 1-5.

Glushkova, V.B. et al., "Specific features in the Behavior of Amorphous Zirconium Hydroxide: I. Sol-Gel Processes in the Synthesis of Zirconia," *Glass Physics and Chemistry* vol. 29, No. 4, pp. 415-421 (2003).

Glushkova, V.B. et al., "Investigation into the Properties of a New Precursor for Preparation of Tetragonal Zirconia," *Glass Physics and Chemistry* vol. 29, No. 6, pp. 613-620 (2003).

Gomez, R. et al., "Dehydroxylation and the Crystalline Phases in Sol-Gel Zirconia," *Journal of Sol-Gel Science and Technology* 11, pp. 309-319 (1998).

Gong, Jianghong et al., "ac Impedance Study of Zirconia Doped with Yttria and Calcia," *J. Am. Ceram. Soc.* 83 [3], pp. 648-650 (2000).

Grabis J. et al., "Ultrafine oxide composite powders for fuel cells," *Institute of Inorganic Chemistry of Latvian Academy of Sciences, Miera* 34 LV 2169 Salaspils, (1996).

Guilino, Antonio et al., "Surface segregation and effect of mechanical stress on Sb-stabilised tetragonal zirconia," *J. Mater. Chem.* 7(6), pp. 1023-1027 (1997).

Guo, Gong-Yi et al., "High-quality zirconia powder resulting from the attempted separation of acetic acid from acrylic acid with zirconium oxychloride," *The Royal Society of Chemistry*, pp. 1283-1287 (2001).

Guo, Xin, "Low temperature degradation mechanism of tetragonal zirconia ceramics in water: role of oxygen vacancies," *Solid State Ionics* 112, pp. 113-116 (1998).

Guo, Xin "Roles of Alumina in Zirconia for Functional Applications," *J. Am. Ceram Soc.* 86 [11], pp. 1867-1873 (2003).

Guo., Xin et al., "Blocking Grain Boundaries in Yttria-Doped and Undoped Ceria Ceramics of High Purity," *J. Am. Ceram Soc.* 86 [11], pp. 77-87 (2003).

Guo, Xin et al., "Hydrothermal degradation of cubic zirconia," *Acta Marerialia* 51, pp. 5123-5130 (2003).

Haneczok, G. et al., "A fractional model of viscoelastic relaxation," *Materials Science and Engineering* Axxx (2003) xxx-xxx, pp. 1-4.

Haneda, Masaaki et al., "$CeO_2$-$ZrO_2$ binary oxides for $NO_x$ removal by sorption," *Phys. Chem. Chem. Phys.* 3, pp. 4696-4700 (2001).

Hattori, Masatoshi et al., "Effect of aging on conductivity of yttria stabilized zirconia," *Journal of Power Sources* 126, pp. 23-27 (2004).

He, Daiping et al., "Synthesis and surface characteristics of zirconia and modified zirconia: Performance of CO hydrogenation," *Catalysis Letters* vol. 84, Nos. 1-2, pp. 89-93 (Nov. 2002).

Höche, Thomas et al., "Partial Stabilization of Tetragonal Zirconia in Oxynitride Glass-Ceramics," *J. Am. Ceram. Soc.* 81 [8], pp. 2029-2036 (1998).

Hu, Michael Z.-C. et al., "Nanocrystallization and Phase Transformation in Monodispersed Ultrafine Zirconia Particles from Various Homogeneous Precipitation Methods," *J. Am. Ceram. Soc.* 82 [9], pp. 2315-2320 (1999).

Huang, Chuanyong et al., "Differences between Zirconium Hydroxide ($Zr(OH)_4 \cdot nH_2O$) and Hydrous Zirconia ($ZrO_2 \cdot nH_2O$)," *J. Am. Ceram. Soc.* 84 [7], pp. 1637-1638 (2001).

Hu-min, Cheng et al., "The Effects of pH and Alkaline Earth Ions on the Formation of Nanosized Zirconia Phases Under Hydrothermal Conditions," *Journal of the European Ceramic Society* 19, pp. 1675-1681 (1999).

Igawa, Naoki et al., "Phase-transformation study of metastable tetragonal zirconia powder," *Journal of Materials Science* 33, pp. 4747-4758 (1998).

Ikeda, Yoshiki et al., "Structure of the Active Sites on $H_3PO_4$/$ZrO_2$ Catalysts for Dunethyl Carbonate Synthesis from Methanol and Carbon Dioxide," *J. Phys. Chem. B* 105, pp. 10653-10658 (2001).

Inoue, Masashi et. al., "Glycothermal synthesis of zirconia-rare oxide solid solutions," *Catalysis Letters* 65, pp. 79-83 (2000).

Iskandar, Ferry et al., "Preparation of microencapsulated powders by an aerosol spray method and their optical properties," *Advanced Powder Technol.* vol. 14, No. 3, pp. 349-367 (2003).

Ismail, Hamdy M., "Characterization of the decomposition products of zirconium acetylcetonate: nitrogen adsorption and spectrothermal investigation," *Powder Technology* 85, pp. 253-259 (1995).

Jakubus, P. et al., "Texture of Zirconia Obtained by Forced Hydrolysis of $ZrOCl_2$ Solutions Influence of aging on thermal behavior," *Journal of Thermal Analysis and Calorimetry* vol. 72, pp. 299-310 (2003).

Jiang, De-en et al., "Preparation of $ZrO_2$-supported MgO with high surface area and its use in mercaptan oxidation of jet fuel," *Applied Catalysis A: General* 201, pp. 169-176 (2000).

Jiménez-Garcia S. et al., "Synthesis of an Al-ZrO2 composite by infiltration of Zr-chelates into an Al matrix," *Mat. Res. Innovat.* 7, pp. 199-204 (2003).

Joo, Jin et al., "Multigram Scale Synthesis and Characterization of Monodisperse Tetragonal Zirconia Nanocrystals," *J. Am. Chem. Soc.* 125, pp. 6553-6557 (2003).

Juárez, R.E. et al., "Synthesis of nanocrystalline zirconia powders for TZP ceramics by a nitrate-citrate combustion route," *Journal of the European Ceramic Society* 20, pp. 133-138 (2000).

Jung, Kyeong Taek et al.,, "The effects of synthesis and pretreatment conditions on the bulk structure and surface properties of zirconia," *Journal of Molecular Catalysis A: Chemical* 163, pp. 27-42 (2000).

Jung, Kyeong Taek et al., "Effects of zirconia phase on the synthesis of methanol over zirconia-supported copper," *Catalysis Letters* vol. 80, Nos. 1-2, pp. 63-68 (2002).

Kaddouri, C. et al., "On the activity of $ZrO_2$ Prepared by Different Methods," *J. Thermal Analysis* vol. 53, pp. 97-109 (1988).

Karthikeyan, Jeganathan et al., Nanomaterial Deposits Formed by DC Plasma Spraying of Liquid Feedbacks, *J. Am. Ceram. Soc.* 83 [11] 123-28 (1999).

Kasatkin, I. et al., "HRTEM observation of the monoclinic-to-tetragonal (*m-t*) phase transition in nanocrystalline $ZrO_2$," *Journal of Materials Science* 39, pp. 2151-2157 (2004).

Kerkwijk, Bas et al., "Friction behaviour of solid oxide lubricants as second phase in α-$Al_2O_3$ and stabilised $ZrO_2$ composites," *Wear* 256, pp. 182-189 (2004).

Kikkawa, S. et al., "Soft solution preparation methods in a $ZrO_2$-$Al_2O_3$ binary system," *Solid State Ionics* 151, pp. 359-364 (2002).

Kim, Byung-Kook et al., "Quantitative phase analysis in tetragonal-rich tetragonal/monoclinic two phase zirconia by Raman spectroscopy," *Journal of Materials Science Letters* 16, pp. 669-671 (1997).

Kim, Duk-Jun et al., "Effects of Alkaline-Earth-Metal Addition on the Sinterability and Microwave Characteriatics of (Zr,Sn)$TiO_4$ Dielectrics," *J. Am. Ceram. Sec.* 83[4], pp. 1010-1012 (2000).

Kim, Young et al., "A Sol-Gel-Based Approach to Synthesize High-Surface-Area Pt-Ru Catalysts as Anodes for DMFCs", *Journal of the Electrochemical Society* 150 (11), pp. A1421-A1431 (2003).

Koh, Young-Hag et al., "Macrochanneled Tetragonal Zirconia Polycrystals Coated by a Calcium Phosphate Layer," *J. Am. Ceram. Soc.* 86 [12], pp. 2027-2030 (2003).

Kohl, F. et al., "New Strategies for trace analyses of $ZrO_2$, SiC and $Al_2O_3$ ceramic powders," *Fresenius J. Anal Chem.* 359, pp. 317-325 (1997).

Kolen'ko, Yu.V. et al., "Synthesis of $ZrO_2$ and $TiO_2$ nanocrystalline powders by hydrothermal process," *Materials Science & Engineering* C 23, pp. 1033-1038 (2003).

Kosacki, Igor et al., "Raman Spectroscopy of Nanocrystalline Ceria and Zirconia Thin Films," *J. Am. Ceram. Soc.* 85 [11], pp. 2646-2650 (2003).

Kubo, T. et al., "Effect of calcining temperature on the tetragonal-to-monoclinic phase transition characteristics in 2 mol% yittra-doped zirconia ceramics," *Journal of Materials Science* 35, pp. 3053-3067 (2000).

Kundakovic, Lj. et al., "Deep oxidation of methane over zirconia supported Ag Catalysts," *Applied Catalysts A: General* 183, pp. 35-51 (1999).

Kytökivi, Arla et al., "Controlled Formation of $ZrO_2$ in the Reaction of $ZrCl_4$ Vapor with Prous Silica and γ-Alumina Surfaces," *Langmuir* vol. 12, No. 18, pp. 4395-4403 (1996).

Lamas, Diego G. et al., "Metastable forms of the tetragonal phase in compositionally homogeneous, nanocrystalline zirconia-ceria powders synthesised by gel-combustion," *J. Mater. Chem.* 13, pp. 904-910 (2003).

Lee, Jong-Heun et al., "Inhomogeneity of Grain-Boundary Resistivity in Calcia-Stabilized Zirconia," *J. Am. Ceram. Soc.* 85 [6], pp. 1622-1624 (2002).

Lee, Jong-Heun et al., "Effect of Alumina Addition on the Distribution of Intergranular-Liquid Phase during Sintering of 15-mol%-Calcia-Stabilized Zirconia," *J. Am. Ceram. Soc.* 86 [9], pp. 1518-1521 (2003).

Lee, Mei-Hwa et al., "Synthesis of Spherical Zirconia by Precipitation Between Two Water/Oil Emulsions," *Journal of the European Ceramic Society* 19, pp. 2593-2603 (1999).

Lee, Seung Kun et al., "Scratch Damage in Zirconia Ceramics," *J. Am. Ceram. Soc.* 83 [6], pp. 1428-1432 (2000).

Lenggoro, I. Wuled et al., "An experimental and modeling investigation of particle production by spray pryolysis using a laminar flow aerosol reactor," *J. Mater Res.* vol. 15, No. 3, pp. 733-743 (Mar. 2000).

Li, Can, "Advances in UV Raman Spectroscopic Studies on Catalysts and Catalyst Preparation," *State Key Laboratory of Catalysis, Dalian Institute of Chemical Physics. Chinese Academy of Sciences*, (2003).

Li, Liangrong et al., "Synthesis and characterization of monoclinic $ZrO_2$ nanorods by a novel and simple precursor thermal decomposition approach," *Solid State Communications* 127, pp. 639-643 (2003).

Li, Meijun et al., "Phase Transformation in the Surface Region of Zirconia Detected by UV Raman Spectroscopy," *J. Phys. Chem. B* 105, pp. 8107-8111 (2001).

Li, Yingwei et al., "Effects of redox properties and acid-base properties on isosynthesis over $ZrO_2$-based catalysts," *Journal of Catalysis* 221, pp. 584-593 (2004).

Liang, Jiahe, et al., "Photoluminescence of Tetragonal $ZrO_2$ Nanoparticles Synthesized by Microwave Irradiation," *Inorg. Chem.* 41, pp. 3602-3604 (2002).

Liao, Fu-Hui et al., "Preparation, crystal structure and electrorheological performance of nano-sized particle materials containing $ZrO_2$," *Journal of Solid State Chemistry* 176, pp. 273-278 (2003).

Limaye, Amit T. et al., "Morphological Control of Zirconia Nanoparticles through Combustion Aerosol Synthesis," *J. Am. Ceram. Soc.* 85 [5], pp. 1127-1132 (2002).

Lin, G.Y. et al., "In-situ TEM Observations of Tetragonal to Monoclinic Phase Transformation in $ZrO_2$-2 mol% $Y_2O_3$ Ceramics," *Ceramics International* 24, pp. 307-312 (1998).

Lin, Jyung-Dong et al., "The use of X-ray line profile analysis in the tetragonal to monoclinic phase transformation of ball milled, as-sintered and thermally aged zirconia powders," *Journal of Materials Science* 32, pp. 4901-4908 (1997).

Lin, Jyung-Dong et al., "The use of X-ray line profile analysis to investigate crystallite size and microstrain for zirconia powders," *Journal of Materials Science* 32, pp. 5779-5790 (1997).

Lin, Jyung-Dong et al., "Correlation of mechanical properties and composition in tetragonal $CeO_2$-$Y_2O_3$-$ZrO_2$ ceramic system," *Materials Chemistry and Physics* 78, pp. 246-252 (2002).

Liu, Xin-Mei et al., "Recent Advances in Catalysts for Methanol Synthesis via Hydrogenation of CO and $CO_2$," *Ind. Eng. Chem. Res.* 42, pp. 6518-6530 (2003).

Liu, Yangqiao "Effect of 2-Phosphonobutane-1,2,4-tricarboxylic Acid Adsorption on the Stability and Rheological Properies of Aqueous Nanosized 3-mol%-Yttria-Stabilized Tetragonal-Zirconia Polycrystal Suspensions," *J. Am. Ceram. Soc.* 86 [7], pp. 1106-1113 (2003).

Liu, Zheng et al., "Electron Spin Resonance Studies of CuO Supported on Tetragonal $ZrO_2$," *Journal of Catalysis* 172, pp. 243-246 (1997).

Liu, Zheng et al., "The incorporated dispersion of vanadium oxide and its influence on the textural properties of tetragonal $ZrO2$," *Materials Chemistry and Physics* 56, pp. 134-139 (1998).

Manoharan, Solomon Sundar et al., "Microwave-Assisted Synthesis of Fine Particle Oxides Employing Wet Redox Mixtures," *J. Am. Ceram. Soc.* 85 [10], pp. 2469-2471 (2003).

Maschio, Stefano et al., "Synthesis and sintering of chenically derived $BaO$-$ZrO_2$ solid solutions," *Journal of the European Ceramic Society* 24, pp. 2241-2246 (2004).

Matsui, Koji et al., "Formation Mechanism of Hydrous-Zirconia Particles Produced by Hydrolysis of $ZrOCl_2$ Solutions: II," *J. Am. Ceram. Soc.* 83 [6], pp. 1386-1392 (2000).

Matsui, Koji et al., "Formation Mechanism of Hydrous-Zirconia Particles Produced by Hydrolysis of $ZrOCl_2$ Solutions: III, Kinetics Study for the Nucleation and Crystal-Growth Processes of Primary Particles," *J. Am. Ceram. Soc.* 84 [10], pp. 2303-2312 (2001).

Matsui, Koji et al., Formation Mechanism of Hydrous-Zirconia Particles Produced by Hydolysis of $ZrOCl_2$ Solutions: IV, Effects of $ZrOCl_2$ Concentration and Reaction Temperature, *J. Am. Ceram. Soc.* 85 [3], pp. 545-553 (2002).

Matta, Joseph et al., "Transformation of tetragonal zirconia phase to monoclinic phase in the presence of $Fe^{3+}$ ions as probes: an EPR study," *Phys. Chem. Chem. Phys.* 1, pp. 4975-4980 (1999).

Meskin, Pavel E. et al., "Synthesis of Ultrafine Oxide Powders by Hydrothermal-Ultrasonic Method," *Mat. Res. Soc. Symp. Proc.* vol. 788, pp. L8.12.1-12.6 (2004).

Mishra, R.S., et al., "Preparation of a $ZrO2$-$Al_2O_3$ nanocomposite by high-pressure sintering of spray-pyrolyzed powders," *J. Mater. Res.* vol. 14, No. 3, pp. 834-840 (Mar. 1999).

Molchanov, V.V. et al., "Mechanochemistry of catalysts," *Russian Chemical Reviews* 69 [5], pp. 435-450 (2000).

Moon, Jaeyun et al., "The effects of heat treatment on the phase transformation behavior of plasma-sprayed stabilized $ZrO_2$ coatings," *Surface & Coatings Technology* 155, pp. 1-10 (2002).

Morterra, Claudio et al., "IR Study of the low temperature adsorption of CO on tetragonal zirconia and sulfated tetragonal zirconia," *Applied Surface Science* 126, pp. 107-128 (1998).

Müller, Christian et al., "Combustion of methane over palladium/zirconia: effect of Pd-particle size and role of lattice oxygen," *Catalysis Today* 47, pp. 245-252 (1999).

Müller, E. et al., "Investigations of nanocrystalline ceramics and powders by TEM, AFM and plasticity measurements," *Fresenius J. Anal. Chem.* 361, pp. 594-597 (1998).

Mueller, Roger et al., "Zirconia Nanoparticles Made in Spray Flames at High Production Rates," *J. Am. Ceram. Soc.* 87 [2], pp. 197-202 (2004).

Nabarro, F. R. N. "Two-phase materials for high-temperature service," *Intermetallics* 8, pp. 979-985 (2000).

Nakajima, K. et al., "Thermal decomposition of zirconia-alumina gels prepared by the electrochemical method," *Solid State Ionics* 101-103, pp. 131-135 (1997).

Nakano, Yasuko et al.,, "Hydrogenation of Conjugated Dienes over $ZrO_2$ by $H_2$ and Cyclohexadiene", *Journal of Catalysis* 80, pp. 307-314 (1983).

Nakano, Yasuko et al.,, "Surface Properties of Zirconium Oxide and Its Catalytic Activity for Isomerization of 1-Butene", *Journal of Catalysis* 57, pp. 1-10 (1979).

Nasar, R.S. et al., "Sintering mechanisms of $ZrO_2$ MgO with addition of $TiO_2$ and CuO," *Ceramics International* xxx (2004) xxx-xxx.

Navio, J.A. et al., "Preparation and Physicochemical Properties of $ZrO_2$ and $Fe/ZrO_2$ Prepared by a Sol-Gel Technique," *Langmuir* 17, pp. 202-210 (2001).

Newsome, D., "The Water-Gas Shift Reaction", *Catal. Rev.-Sci. Eng.* 21(2), pp. 275-318 (1980).

Noh, Hee-Jin et al., "Synthesis and crystallization of anisotropic shaped $ZrO_2$ nanocrystalline powders by hydrothermal process," *Materials Letters* 57, pp. 2425-2431 (2003).

Occhiuzzi, Manlio et al., "Manganese ions in the monoclinic, tetragonal and cubic phases of zirconia: an XRD and EPR study," *Phys. Chem. Chem. Phys.* 5, pp. 4938-4945 (2003).

Ohtsuka, Hirofumi, "Effects of transition metal promoters on the thermal stability of sulfated zirconia," *Catalysis Letters* vol. 90, Nos. 3-4, pp. 213-219 (Oct. 2003).

Ozaki, Tetsuya et al., "Redox Behavior of Surface-Modified $CeO_2$-$ZrO_2$ Catalysts by Chemical Filing Process," *Chem. Mater.* 12, pp. 643-649 (2000).

Ozawa, Masakuni et al., "Neutron and Raman scattering studies of surface adsorbed molecular vibrations and bulk phonons in $ZrO_2$ nanoparticles," *Applied Surface Science* 121/122, pp. 133-137 (1997).

Palchik, Oleg et al., "Microwave assisted preparation of binary oxide nanoparticles," *J. Mater. Chem.* 10, pp. 1251-1254 (2000).

Pang, Guangsheng et al., "Preparing a Stable Colloidal Solution of Hydrous YSZ by Sonication," *Langmuir* 17, pp. 3223-3226 (2001).

Parida, Kulamani et al., "Freeze-dried promoted and unpromoted sulfated zirconia and their catalytic potential," *J. Mater,. Chem.* 11, pp. 1903-1911 (2001).

Patra, Amitava et al., "Upconversion in $Er^{3+}$:$ZrO_2$ Nanocrystals," *J. Phys. Chem. B* 106, pp. 1909-1912 (2002).

Pengpanich, Sitthiphong et al., "Catalytic oxidation of methane over $CeO_2$-$ZrO_2$ mixed oxide solid solution catalysts prepared via urea hydrolysis," *Applied Catalysis A: General* 234, pp. 221-233 (2002).

Pfeiffer, Heriberto et al., "Reaction mechanisms and kinetics of the synthesis and decomposition of lithium metazirconate through solid-state reaction," *Journal of the European Ceramic Society* 24, pp. 2433-2443 (2004).

Pieck, C.L. et al., "Chemical Structures of $ZrO2$-Supported V-Sb Oxides," *Chem. Mater.* 13, pp. 1174-1180 (2001).

Pieck, C.L. et al., "Bulk and Surface Structures of $V_2O_5$/$ZrO_2$ Systems and Their Relevance for o-Xylene Oxidation," *Langmuir* 18, pp. 2642-2648 (2002).

Pilloud, D. et al., "Stabilisation of tetragonal zirconia in oxidised Zr-Si-N nanocomposite coatings," *Applied Surface Science* xxx (2004) xxx-xxx.

Pokrovski, Konstantin et al., "Investigation of CO and $CO_2$ Adsorption on Tetragonal and Monoclinic Zirconia," *Langmuir* 17, pp. 4297-4303 (2001).

Popa, Monica et al., "Crystallization of gel-derived and quenched glasses in the ternary oxide $Al_2O_3$-$ZrO_2$-$SiO_2$ system," *Journal of Non-Crystalline Solids* 297, pp. 290-300 (2002).

Popović, S. et al., "A search for solid solutions in the $a$-$Al_2O_3$-$m$-$ZrO_2$ system by XRD," *Materials Letters* 31, pp. 19-22 (1997).

Purnama, H. et al., "Activity and selectivity of a nanostructured $CuO/ZrO_2$ catalyst in the steam reforming of methanol," *Catalysts Letters* vol. 94, Nos. 1-2, pp. 61-68 (Apr. 2004).

Qi, Xiaomei et al., "Activity and Stability of Cu-$CeO_2$ Catalysts in High-Temperature Water-Gas Shift for Fuel-Cell Applications," xxxx *American Chemical Society*, (2004).

Ramamoorthy, R. et al., "X-ray Diffraction Study of Phase Transformation in Hydrolyzed Zirconia Nanoparticles," *Journal of the European Ceramic Society* 19, pp. 1827-1833 (1999).

Ramaswamy, Parvati et al., Evaluation of $CaO$-$CeO_2$-partially stabilized zirconia thermal barrier coatings, *Ceramics International* 25, pp. 317-324 (1999).

Raming, Tomas P. et al., "Influence of Temperatoure and Pressure on the Densification, Microstructure, and Electrical Properties of the Dual-Phase System $Y_2O_3$-Doped $ZrO_2$ and $RuO_2$," *Chem. Mater* 13, pp. 284-289 (2001).

Ramos-Brito, F. et al., "Preparation and characterization of photoluminescent praseodymium-doped $ZrO_2$ nanostructured powders," *J. Phys. D: Appl. Phys.* 37, pp. L13-L16 (2004).

Rangel, Enrique Rocha et al., "Efecto del MgO y CaO en la producción de cerámicos mullita-$ZrO_2$," *Ingenierias, Enero-Marz* vol. VI, No. 18, pp. 55-61 (2003).

Rao, P.G. et al., "Preparation and mechanical properties of $Al_2O_3$-15wt.%$ZrO_2$ composites," *Scripta Materiala* 48, pp. 437-441 (2003).

Ray, Jugadish C. et al., "Chemical synthesis and structural characterization of nanocrystalline powders of oure zirconia and yttria stabilized zirconia (YSZ)," *Journal of the European Ceramic Society* 20, pp. 1289-1295 (2000).

Rauchs, G. et al., "Tetragonal-to-monoclinic phase transformation in $CeO_2$-stabilised zirconia under uniaxial loading," *Journal of the European Ceramic Society* 21 pp. 2229-2241 (2001).

Rauchs, G. et al., "Tetragonal-to-monoclinic phase transformation in CeO2-stabilized zirconia under multiaxial loading," *Journal of the European Ceramic Society* 22, pp. 841-849 (2002).

Reddy, Benjaram M. et al., "Raman and X-ray Photoelectron Spectroscopy Study of $CeO_2$-$ZrO_2$ and $V_2O_5$/$CeO_2$-$ZrO_2$ Catalysts," *Langmuir* 19, pp. 3025-3030 (2003).

Reddy, Kondakindi Rajender et al., "Structure and Reactivity of Molybdenum Oxide Catalysts Supported on $La_2O_3$-Stabilized Tetragonal $ZrO_2$," *Langmuir* 19, pp. 10795-10802 (2003).

Rodriguez, José Luis et al., "Study of Zircon-Dolomite Reactions Monitored by Neutron Thermodiffractometry," *Journal of Solid State Chemistry* 166, pp. 426-433 (2002).

Rong, Tian Jun et al., "State of Magnesia in Magnesia (10.4 mol%)-Doped Zirconia Powder Prepared From Coprecipitation," *J. Am. Ceram. Soc.* 85 [5], pp. 1334-26 (2002).

Rossignol, S. et al., "Preparation of zirconia-ceria materials by soft chemistry," *Catalysis Today* 50, pp. 261-270 (1999).

Safonov, A. Andrey et al., "Oxygen vacancies in tetragonal $ZrO_2$: ab initio embedded cluster calculations," *Microelectronic Engineering* 69, pp. 629-632 (2003).

Sallé, C. et al., "Detection of tetragonal zirconia in alumina-zirconia powders by thermoluminescence," *Journal of the European Ceramic Society* 23, pp. 667-673 (2003).

Sato, E. et al., "Effect of small amount of alumina doping on superplastic behavior of tetragonal zirconia," *Journal of Materials Science* 34, pp. 4511-4518 (1999).

Schultz, Uwe "Phase Transformation in EB-PVD Yttria Partially Stabilized Zirconia Thermal Barrier Coatings during Annealing," *J. Am. Ceram. Soc.* 83 [4], pp. 904-910 (2000).

Sekulic, A. et al., "Determination of the monoclinic, tetragonal and cubic phases in mechanically alloyed $ZrO_2$-$Y_2O_3$ and $ZrO_2$-CoO powder mixtures by Raman spectroscopy," *Journal of Materials Science Letters* 16, pp. 260-262 (1997).

Sergo, Valter "Room-Temperature Aging of Laminate Composites of Alumina/3mol%-Yttria-Stabilized Tetagonal Zirconia Polycrystals," *J. Am. Ceram. Soc.* 87 [2], pp. 267-250 (2000).

Sharma, Renu et al., "In Situ Studies of Nitridation of Zirconia ($ZrO_2$)," *Chem. Mater.* 13, pp. 4014-4018 (2001).

Shevchenko, V.Ya. et al., "Structure of Nanosized Zirconia Centaur Particles," *Glass Physics and Chemistry* vol. 27, No. 4, pp. 400-405 (2001).

Shevchenko, V.Ya. et al., "Coexistence of Cubic and Tetragonal Structures in Yttria-Stabilized Zirconia Nanoparticles," *Inorganic Materials* vol. 37, No. 9, pp. 950-952 (2001).

Shevchenko, V.Ya. et al., "Structure of Nanoparticles: II. Magic Numbers of Zirconia Nanoparticles," *Glass Physics and Chemistry* vol. 28, No. 1, pp. 44-49 (2002).

Shukla, S. et al., "Effect of HPC and water concentration on the evolution of size, aggregation and crystallization of sol-gel nano zirconia," *Journal of Nanoparticle Research* 4, pp. 553-559 (2002).

Shukla, S. et al., "Sol-Gel Synthesis and Phase Evolution Behavior of Sterically Stabilized Nanocrystalline Zirconia," *Journal of Sol-Gel Science and Technology* 27, pp. 119-136 (2003).

Shukla, Satyajit et al., "Thermodynamic Tetragonal Phase Stability in Sol-Gel Derived Nanodomains of Pure Zirconia," *J. Phys. Chem. B.* vol. 108, No. 11, pp. 3395-3399 (2004).

Shukla, Satyajit et al., "Effect of Nanocrystallite Morphology on the Metastable Tetragonal Phase Stabilization in Zirconia," *Nano Letters* vol. 2, No. 9, pp. 989-993 (2002).

Sickafus, K.E. et al., "Radiation damage effects in zirconia," *Journal of Nuclear Materials* 274, pp. 66-77 (1999).

Siligardi, Cristina et al., Bulk Crystallization of Glasses Belonging to the Calcia-Zirconia-Silica System by Microwave Energy, *J. Am. Ceram. Soc.* 83 [4], pp. 1001-1003 (2000).

Silva, V.V., "Synthesis and characterization of composite powders of partially stabilized zirconia and hydroxyapatite," *Materials Characterization* 45, pp. 51-59 (2000).

Silva, V.V., "Synthesis and characterization of calcia partially stabilized zirconia-hydroxyapatite powders prepared by co-precipitation method," *Ceramics International* 27, pp. 615-620 (2001).

Simeone D. et al., "Investigation on the zirconia phase transition under irradiation," *Journal of Nuclear Materials* 281, pp. 171-181 (2000).

Simha, N. K., "Twin and Habit Plane Microstrouctures Due To Tetragonal To Monoclinic Transformation of Zirconia," *J. Mech. Phys. Solids* vol. 45, No. 2, pp. 261-292 (1997).

Sobol, A.A., et al., "Stress-induced cubic-tetragonal transformation in partially stabilized $ZrO_2$: Raman spectroscopy study," *Journal of Physics and Chemistry of Solids* xx (2004) xxx-xxx.

Sohn, Jong Rack et al., "Characterization of Zirconia-Supported Tengsten Oxide Catalyst," *Langmuir* 14, pp. 6140-6145 (1988).

Sohn, Jong Rack et al., "Characterization of Vanadium Oxide Supported on Zirconia and Modified with $MoO_3$," *Bull. Korean Chem. Soc.* vol. 24, No. 3, pp. 311-317 (2003).

Song, Chunshan, "Fuel processing for low-temperature and high-temperature fuel cells: Challenges, and opportunities for sustainable development in the 21st century," *Catalysis Today* 77, pp. 17-49 (2002).

Stachs, O. et al., "Atomic-scale structure of $ZrO_2$ xerogels by X-ray diffraction and reverse Monte Carlo simulations," *Journal of Non-Crystalline Solids* 210, pp. 14-22 (1997).

Štefanić, G. et al., "The effect of mechanical treatment of zirconium(IV) hydroxide on its thermal behaviour," *Thermochimica Acta* 259, pp. 225-234 (1995).

Štefanić, G. et al., "Influence of the synthesis conditions on the properties of hydrous zirconia and the stability of low-temperature t-$ZrO_2$," *Materials Chemistry and Physics* 65, pp. 197-207 (2000).

Štefanićc, Goran et al., "Factors Influencing the Stability of Low Temperature Tetragonal $ZrO_2$," *CCACAA* 75 (3), pp. 727-767 (2002).

Stichert, Wolfram et al., "Influence of Crystallite Size on the Properties of Zirconia," *Chem. Mater.* 10, 2020-2026 (1998).

Sturm, A. et al., "Grain Growth and Phase Stability in a Nanocrystalline $ZrO_2$—15w% $Al_2O_3$ Ceramic," *NanoStructured Materials* vol. 11, No. 5, pp. 651-661 (1999).

Su, Stephen C et al., "A Study of the Structure of Vanadium Oxide Dispersed on Zirconia," *J. Phys. Chem. B.* 102, pp. 7000-7007 (1998).

Suh, Young-Woong et al., "Synthesis of thermally stable tetragonal zirconia with large surface area and its catalytic activity in the skeletal isomerization of 1-butene", *Catalysis Letters* vol. 90, Nos. 1-2, pp. 103-109 (Sep. 2003).

Suzuki, Takayuki et al., "Sinterability of Spinel ($MgAl_2O_4$)-Zirconia Composite Powder Prepared by Double Nozzle Ultrasonic Spray Pyrolysis," *Journal of the European Ceramic Society* 16, pp. 1171-1178 (1996).

Suzuki, Tohru S. et al., "Effect of Ultrasonication on the Microstructure and Tensile Elongation of Zirconia-Dispersed Alumina Ceramics Prepared by Colloidal Processing," *J. Am. Ceram. Soc.* 84 [9], pp. 2132-2134 (2002).

Swartz, S.L. et al., "Fuel processing catalysts based on nanoscale ceria," *Fuel Cells Bulletin 30*, pp. 7-10 (2001).

Tadokoro, S.K. et al., "Physical characteristics and sintering behavior of ultrafine zirconia-ceria powders," *Journal of the European Ceramic Society* 22, pp. 1723-1728 (2002).

Tai, Clifford Y. et al., "Control of zirconia particle size by using two-emulsion precipitation technique," *Chemical Engineering Science* 56, pp. 2389-2398 (2001).

Takasu, Y. et al., "Effect of Structure of Carbon-Supported PtRu Electrocatalysts on the Electrochemical Oxidation of Methanol", *Journal of the Electrochemical Society* 147 (12), pp. 4421-4427 (2000).

Tanabe, K., "Surface and Catalytic Properties of $ZrO_2$", *Materials Chemistry and Physics* 13, pp. 347-364 (1985).

Tanaka, Yasutaka et al.,, "Hydrogenation and Dehydrogenation of 4-Isopropenyl-1-methylcyclohexene Catalyzed by MgO, CaO, $La_2O_3$, $ThO_2$, and $ZrO_2$", *Bulletin of the Chemical Society of Japan* vol. 51 (12), pp. 3641-3642 (1978).

Tani, Takao et al., "Morphology of Oxide Particles Made by the Emulsion Combustion Method," *J. Am. Ceram. Soc.* 86 [6], pp. 898-904 (2003).

Tom, Renjis T. et al., "Freely Dispersible Au$\alpha$TiO$_2$, Au$\alpha$ ZrO$_2$, Ag$\alpha$TiO$_2$, and Ag$\alpha$ZrO$_2$ Core-Shell Nanoparticles: One-Step Synthesis, Characterization, Spectroscopy, and Optical Limiting Properties," *Langmuir* 19, pp. 3439-3445 (2003).

Torres, Francico Jose et al., "Rietveld Refinement of Tetragonal $V^{4+}$-$ZrO_2$ Solid Solutions Obtained from Gels by X-ray Powder Diffraction," *Journal of Solid State Chemistry* 163, pp. 33-36 (2002).

Tseng, Wenjea J. et al., "Transformation strengthening of as-fired zirconia ceramics," *Ceramics International* 25, pp. 545-550 (1999).

Tsubakino, Harushige et al., "Surface Relief Associated with Isothermal Martensite in Zirconia-3-mol%-Yttria Ceramics Observed by Atomic Force Microscopy," *J. Am. Ceram. Soc.* 82 [10], pp. 2921-2925 (1999).

Tsukada, Takayuki et al., "Low-Temperatoure Hydrothermal Synthesis of Yttrium-Doped Zirconia Powders," *J. Am. Ceram. Soc.* 82 [10], 1169-74 (1999).

Uchida, Masaki et al., "Bonelike Apatite Formation Induced on Zirconia Gel in a Simulated Body Fluid and Its Modified Solutions," *J. Am. Ceram. Soc.* 84 [9], pp. 2041-2044 (2001).

Vaidhyanathan, Balasubramaniam et al., "Microwave Effects in Lead Zirconium Titanate Synthesis: Enhanced Kinetics and Changed Mechanisms," *J. Am. Ceram. Soc.* 84 [6], pp. 1197-202 (2001).

Valmalette, J. Ch. et al., "Size Effects on the Stabilization of Ultrafine Zirconia Nanoparticles," *Chem. Mater.* 14, pp. 5098-5102 (2002).

Vassileva, E. et al., "Application of high-surface-area $ZrO_2$ in preconcentration and determination of 18 elements by on-line flow injection with inductively coupled plasma atomic emission spectrometry," *Fresenius J. Anal. Chem.* 370, pp. 52-59 (2001).

Vasylkiv, Oleg et al., "Nonisothermal Synthesis of Yttria-Stabilized Zirconia Nanopowder through Oxalate Processing: I, Characteristics of Y-Zr Oxalate Synthesis and Its Decomposition," *J. Am. Ceram. Soc.* 83 [9], pp. 2196-202 (2000).

Vasylkiv, Oleg et al., "Nonisothermal Synthesis of Yttria-Stabilized Zirconia Nanopowder through Oxalate Processing: II, Morphology Manipulation," *J. Am. Ceram. Soc.* 84 [11], pp. 2484-2488 (2001).

Veytizou, C. et al., "Zircon formation from amorphous silica and tetragonal zirconia: kinetic study and modelling," *Solid State Ionics* 139, pp. 315-323 (2000).

Wang, Chen-Chi et al., "Sol-Gel Synthesis and Hydrothermal Processing of Anatase and Rutile Titania Nanocrystals," *Chem. Mater.* 11, pp. 3113-3120 (1999).

Wang, Xin et al., "Surfactant stabilized Pt and Pt alloy electrocatalyst for polymer electrolyte fuel cells", *Electrochimica Acta* 47, pp. 2981-2987 (2002).

Wang, Ying et al., "Dispersion of Potassium Nitrate and the Resulting Strong Basicity on Zirconia," *Chem. Mater* 13, pp. 670-677 (2001).

Watanabe, Masahiro et al., "Preparation of Highly Dispersed Pt + Ru Alloy Clusters and the Activity for the Electrooxidation of Methanol", *J. Electroanal. Chem.* 229, pp. 395-406 (1987).

Watanabe, Masahiro et al., "Activity and Stability of Ordered and Disordered Co-Pt Alloys for Phosphoric Acid Fuel Cells", *J. Electrochem. Soc.* vol. 141, No. 10, pp. 2659-2667 (Oct. 1994).

Wei, Wen-Cheng J. et al., "Electrokinetic Properties of Colloidal Zirconia Powders in Aqueous Suspension," *J. Am. Ceram. Soc.* 82 [12], pp. 3385-3392 (1999).

Weyl, Axel et al., "High Temperature Ionic Conduction in Multicomponent Solid Oxide Solutions Based on Zirconia," *J. Am. Ceram. Soc.* 80 [4], pp. 866-875 (1997).

Winterer, M. et al., "Phase Stability in Nanostructured and Coarse Grained Zirconia at High Pressures," *NanoStructured Materials* vol. 5, No. 6, pp. 679-688 (1995).

Wu, Nae-Lih et al., "Enhanced Phase Stability for Tetragonal Zirconia in Precipitation Synthesis," *J. Am. Ceram. Soc.* 83 [12], pp. 3225-3227 (2000).

Wu, Nae-Lih et al., "Thermodynamic stability of tetragonal zirconia nanocrystallites," *J. Mater. Res.* vol. 16, No. 3, pp. 666-669 (Mar. 2001).

Xia, Bin et al., "$ZrO_2$ Nanopowders Prepared by Low-Temperature Vapor-Phase Hydrolysis," *J. Am. Ceram. Soc.* 83 [5], pp. 1077-1080 (2000).

Xia, Bin et al., "Novel Route to Nanoparticle Synthesis by Salt-Assisted Aerosol Decomposition," *Adv. Mater.* 13, No. 20, pp. 1579-1582 (Oct. 16, 2001).

Xia, Bin et al., "Synthesis of $CeO_2$ nanoparticles by salt-assisted ultrasonic aerosol decomposition," *J. Mater. Chem.* 11, pp. 2925-2927 (2001).

Xie, Shuibo et al.,, "Water-Assisted Tetragonal-to-Monoclinic Phase Transformation of $ZrO_2$ at Low Temperatures," *Chem. Mater.* 12, pp. 2442-2447 (2001).

Xu, Bo-Qing, et al., "Size Limit of Support Particles in an Oxide-Supported Metal Catalyst: Nanocomposite Ni/$ZrO_2$ for Utilization of Natural Gas," *J. Phys. Chem. B* 107, pp. 5203-5207 (2003).

Xu, Gang et al., "Hydrothermal Synthesis of Weakly Agglomerated Nanocrystalline Scandia-Stabilized Zirconia," *J. Am. Ceram. Soc.* 85 [4], pp. 995-997 (2002).

Xu, Gang et al., "Unusual calcination temperature dependent tetragonal-monoclinic transitions in rare earth-doped zirconia nanocrystals†," *Phys. Chem. Chem. Phys.* 5, pp. 4008-4014 (2003).

Xue, Erzeng et al., "A Study of Pt/$ZrO_2$ Catalysts for Water-Gas Shift Reaction in the Presence of $H_2S$", *Studies in Surface Science and Catalysis* $130^D$, pp. 3813 (2000).

Xue, Jie et al., "Influene of impurities on the oxygen activity-dependent variation of the oxygen content of a commercial, CaO-doped $ZrO_2$," *Solid State Ionics* 166, pp. 199-205 (2004).

Yadav Ganapati D. et al., "Friedel-Crafts acylation using sulfated zirconia as a catalyst; Acylation of benzene with 4-chlorobenzoyl cholride over sulfated zirconia as catalyst," *Green Chemistry*, pp. 69-74 (Apr. 1999).

Yadav, Ganapati D. et al., "Sulfated zirconia and its modified versions as promising catalysts for industrial processes," *Microporous and Mesoporous Materials* 33, pp. 1-48 (1999).

Yamaguchi, T., "Hydrogenation of 1,3-Butadiene with 1,3-Cyclohexadiene and $D_2$ over $ZrO_2$ Catalysts", *Journal of American Chemical Society* 99:12, pp. 4201-4203 (Jun. 8, 1977).

Yamaguchi, Tsutomu et al., "High Selectiviyies of Zirconium Oxide Catalyst for Isomerization of 1-Butene and Dehydration of sec-BUTANOL," *Chemistry Letters*, pp. 1017-1018 (1973).

Yang, C.-C.T. et al., "Quantitative characterization of various tetragonal zirconia polycrystals (TZPs)," *Journal of the European Ceramic Society* 22, pp. 199-207 (2002).

Yang, Chuanfang et al., "Production of ultrafine $ZrO_2$ and Y-doped $ZrO_2$ powders by solvent extraction from solutions of perchloric and nitric acid with tri-n-butyl phosphate in kerosene," *Powder Technology* 89, pp. 149-155 (1996).

Yang, Pengcheng et al., "Extended X-ray Absorption Fine Structure Studies on Mixed-Phase Zirconia," *J. Phys. Chem. B* 107, pp. 6511-6513 (2003).

Yashima, Masatomo et al., "Metastable-stable phase diagrams in the zirconia-containing systems utilized in solid-oxide fuel cell application," *Solid State Ionics* 86-88, pp. 1131-1149 (1996).

Yashima, Masatomo et al., "Synthesis of metastable tetragonal ($t^1$) zirconia-calcia solid solution by pyrolysis of organic precursors and coprecipitation route," *J. Mater. Res.* vol. 11, No. 6, pp. 1410-1420 (Jun. 1996).

Yashima, Masatomo et al., "Crystallization of hafnia and ziriconia during the pyrolysis of acetate gels," *J. Mater. Res.* vol. 12, No. 10, pp. 2575-2583 (Oct. 1997).

Yashima, Masatomo "In Situ Observations of Phase Transition Using High-Temperature Neutron and Synchrotron X-ray Powder Diffractometry," *J. Am. Ceram. Soc.* 85 [12], pp. 2925-2930 (2002).

Yasuda, K. et al., "Influence of $Y_2O_3$ distribution on the rate of tetragonal to monoclinic phase transformation of yttria-stabilized zirconia during hydrothermal aging," *Journal of Materials Science* 34, pp. 3597-3604 (1999).

Yokota, Osamu et al., "Synthesis of Metastable Tetragonal ($t'$) $ZrO_2$-12 mol% $YO_{1.5}$ by the Organic Polymerized Complex Method," *J. Am. Ceram. Soc.* 82 [5], pp. 1333-1335 (1999).

Yue, Yinghong et al., "Nanosized titania and zirconia as catalysts for hydrolysis of carbon disulfide," *Applied Catalysis B: Environmental* 46, pp. 561-572 (2003).

Zander, D. et al., "Influence of hydrogen on formation and stability of Zr-based quasicrystals," *Materials Science and Engineering* 294-296, pp. 112-115 (2000).

Zarur, Andray J. et al., "Reverse microemulsion synthesis of nanostructured complex oxides for catalytic combustion," *Nature* vol. 403, pp. 65-67 (Jan. 2000).

Zeng, H.C., "Surface $Ni^{2+}$ diffusion in sol-gel-derived tetragonal and monoclinic $ZrO_2$ matrices," *Journal of Non-Crystalline Solids* 181, pp. 49-57 (1995).

Zhai, HuaZhang et al., "Preparation of tetragonal zirconia containing titanium nitride powder by in-situ selective nitridation," *J. Mater. Chem.* 11, pp. 1092-1095 (2001).

Zhang, Yawen et al., "Microstructures and optical properties of nanocrystalline rare earth stabilized zirconia thin films deposited by a simple sol-gel method," *Materials Letters* 56, pp. 1030-1034 (2002).

Zhu, W.Z. et al., "Effect of Cooling Rate on Tetragonal to Monoclinic Transformation in Hot Pressed $ZrO_2(Y_2O_3)$ Ceramics," *Scripts Metallurgica et Materialia* vol. 33, No. 9, pp. 1439-1444 (1995).

Zhu, W.Z. "Grain Size Dependence of the Transformation Temperature of Tetragonal to Monoclinic Phase in $ZrO_2(Y_2O_3)$ Ceramics," *Ceramics International* 22, pp. 389-395 (1996).

Zhu, W.Z. et al., "Kinetics of isothermal transition from tetragonal to monoclinic phase in $ZrO_2(2\ mol\%Y_2O_3)$ ceramic," *Materials Chemistry and Physics* 44, pp. 67-73 (1996).

Zhu, W.Z. et al., "Effect of Grain Size on the Kinetics of Isothermal Tetragonal to Monoclinic Transformation in $ZrO_2(2\ mol\%\ Y_2O_3)$ Ceramics," *Journal of the European Ceramic Society* 17, pp. 1729-1739 (1997).

Zhu, W.Z., "Effect of Cubic Phase on the Kinetics of the Isothermal Tetragonal to Monoclinic Transformation in $ZrO_2(3mol\%\ Y_2O_3)$ Ceramics," *Ceramics International* 24, pp. 35-43 (1998).

Zwinkels, Marcus F.M. et al., "Thermal Stability of Complex Oxide Combustion Catalyst Supports," *Ind. Eng. Chem. Res.* 37, pp. 391-397 (1998).

Ian A. Fisher and Alexis T. Bell, "In-Situ Infrared Study of Methanol Synthesis from $H2/CO_2$ over $Cu/SO_2$ and $Cu/ZrO_2/SiO_2$," Journal of Catalysis, vol. 172 No. 1 (Nov. 1997), pp. 222-237.

Hamon, et al., "Molten salt preparation of stabilized zirconia catalysts: characterization and catalytic properties" Catalysis Today, vol. 10 (Nov. 18, 1991) pp. 613-627.

Christian A. Müller, Marek Maciejewski, René A. Koeppel, Alfons Baiker, "Combustion of methane over palladium/zirconia: effect of Pd-particle size and role of lattice oxygen," Catalysis Today, vol. 47 (Jan. 1, 1998) pp. 245-252.

Self-organizing nanoporous silica particles: first in the world new energy and industrial technology development organization, Feb. 26-28 (2003) Toyko JP.

Lamas, et. al., "Metastable forms of the tetragonal phase in compositionally homogeneous, nanocrystalline zirconia-ceria powders synthesised by gel-combustion," J. Mater. Chem., 2003, 13, 904-910.

\* cited by examiner

HIGH SURFACE AREA TETRAGONAL ZIRCONIA AND PROCESSES FOR SYNTHESIZING SAME

FIELD OF THE INVENTION

The present invention relates to high surface area zirconia. More particularly, the present invention relates to high surface area tetragonal zirconia and to processes for synthesizing same.

BACKGROUND OF THE INVENTION

The global hydrogen market has been growing very rapidly, with recent growth rates exceeding 10% per year. Currently, about 95% of the hydrogen used today comes from the reforming of natural gas. In the near future, it is expected that the demand of hydrogen will increase due to the introduction of hydrogen fuel cells.

There are three major processes for hydrogen production: steam reforming (SR) (Equation 1), partial oxidation (POX) (Equation 2) and autothermal reforming (ATR) (Equation 3), as illustrated below.

Steam Reforming $CH_4 + H_2O \rightarrow CO + 3H_2$ (1)

Partial Oxidation $CH_4 + \frac{1}{2}O_2 \rightarrow CO + 2H_2$ (2)

Autothermal Reforming $2CH_4 + H_2O + \frac{1}{2}O_2 \rightarrow 2CO + 5H_2$ (3)

Generally, the reformate gases comprise $H_2$, CO and $CO_2$, $H_2O$ and a small amount of unconverted fuel. To maximize hydrogen production and avoid poisoning down stream catalyst, carbon monoxide in the reformate gas should be converted to carbon dioxide through the water gas shift (WGS) reaction, as shown below.

Water Gas Shift Reaction $CO + H_2O \leftrightarrow CO_2 + H_2$ (4)

One of the hurdles in the application of fuel processing to generate hydrogen for fuel cells is the lack of an efficient WGS catalyst. The state-of-the-art WGS catalysts are mostly based on Cu—ZnO and $Fe_3O_4$—$Cr_2O_3$. These catalysts, however, possess slow kinetics, and are very sensitive to temperature excursions and to air exposure. Careful activation is often required for these catalysts. As a result, these catalysts have been deemed unsuitable for the synthesis of hydrogen for fuel cell applications. See, e.g., Song, Chunshan, "Fuel processing for Low-Temperature and High-Temperature Fuel Cells: Challenges, and Opportunities for Sustainable Development in the 21st Century," 77(1-2) *Catalysis Today* at 17-49 (2002). Also, these WGS catalysts are highly sensitive to sulfur, which poses a particular challenge for hydrogen production from coal gasification and integrated gasification combined cycle (IGCC). Thus, there is a great need for active, nonpyrophoric, sulfur resistant WGS catalysts.

Precious metals such as platinum, palladium, rhodium and gold supported on oxides have been reported as being active and stable as WGS catalysts over a wide temperature range. See, e.g., S. L. Swartz, M. M. Seabaugh, C. T. Holt and W. J. Dawson, "Fuel Processing Catalysts Based on Nanoscale Ceria," 30 *Fuel Cell Bulletin* at 7-10 (2001). Additionally, such WGS catalysts overcome the disadvantages of iron and copper based materials, mentioned above.

There is growing interest in implementing zirconium oxide-based compositions as WGS catalysts because of the unique amphoteric properties associated with the surface hydroxyl groups of zirconium oxide and because of its high thermal stability. Also, zirconia-supported metal catalysts are useful in many chemical processes, such as, for example, in methanol synthesis (particularly zirconia-supported copper) and Fischer-Tropsch synthesis (particularly zirconia-supported nickel) processes.

Zirconia formed from conventional preparation methods normally contains a thermally stable monoclinic crystal structure (m—$ZrO_2$), which is known to transition at about 1200° C. to tetragonal phase (t—$ZrO_2$) and at about 2280° C. to cubic phase (c—$ZrO_2$) crystal structures. The physical and chemical properties of zirconia are closely related to the crystal phases and determine its application in various industries. Of the three phases, tetragonal zirconia has great potential for catalytic applications.

Conventional processes for synthesizing tetragonal zirconia, however, have been unable to form high surface area tetragonal zirconia because of sintering encountered during the heat treatment of monoclinic phase zirconia to form tetragonal phase zirconia.

Thus, the need exists for high surface area tetragonal zirconia compositions and for processes to synthesize such high surface area tetragonal zirconia compositions.

SUMMARY OF THE INVENTION

The present invention is directed to high surface area zirconia and to processes for making and using same. In one embodiment, the invention is to a process for synthesizing tetragonal zirconia, the process comprising the steps of: (a) adding a zirconium precursor to a precipitation agent under conditions effective to form a first precipitant; (b) subjecting the first precipitant in a solution to a temperature of from about 80° C. to about 120° C. for a period of time of at least 1 hour to form a digested slurry; (c) spray drying the digested slurry, or a portion thereof (aliquot or non-aliquot), to form dry amorphous zirconia; and (d) calcining the dry amorphous zirconia to form a final zirconia product comprising at least about 99.9 percent tetragonal zirconia, based on the total crystalline zirconia in the final zirconia product as determined by XRD. Steps (c) and (d) optionally occur simultaneously through spray pyrolysis.

In one aspect of the invention, one or more surfactants are added to one or both of the precipitation agent and/or the zirconium precursor. Additionally or alternatively, a morphology enhancing agent optionally is added prior to or during digestion, to the resulting digested slurry, or to a portion thereof. Non-limiting examples of morphology enhancing agents include urea, acetic acid, lactic acid, glycine, alcohols, ammonium nitrate, polymers, polyvinylalcohol and carbohydrazide.

In one aspect of the invention, the process further includes the step of adding a metal precursor to the digested slurry, or a portion thereof, after step (b) and before step (c). The metal precursor optionally comprises a precious metal selected from the group consisting of: platinum, silver, palladium, rhodium, gold, iridium, rhenium, osmium, alloys thereof, and mixtures thereof. In another embodiment, the metal precursor comprises a metal selected from the group consisting of cobalt, nickel, iron, copper, scandium, aluminum, neodymium, ytterbium, samarium, chromium, gadolinium, and mixtures thereof. In another embodiment, the metal precursor comprises a metal selected from the group consisting of cerium, calcium, magnesium, yttrium, lanthanum and mixtures thereof.

In one aspect of the invention, one or more additives, e.g., inert additives, are added to the digestion solution, to the digested slurry, or to a portion thereof, to help maintain desired properties in the final zirconia product. The additive optionally comprises a suspension comprising a component selected from the group consisting of alumina, silica, ceria, calcium oxide and mixtures thereof.

Optionally, the zirconium precursor is selected from the group consisting of: zirconyl nitrate [$ZrO(NO_3)_2$], ziconyl peroxide [$Zr(OC_3H_7)$], zirconium nitrate [$Zr(NO_3)_4$], zirconium actate [$ZrC_2H_4O_2$], zirconium carbonate [$ZrOCO_3$], ammonium zirconium carbonate [$Zr_x(NH_3)_xCH_2O_3$], solutions thereof, and mixtures thereof. Optionally, the precipitation agent is selected from the group consisting of $NH_4OH$, urea, NaOH, KOH, solutions thereof, and mixtures thereof.

Preferably, the final zirconia product has a surface area greater than about 50 $m^2/g$, greater than about 80 $m^2/g$, greater than about 100 $m^2/g$, or greater than about 150 $m^2/g$.

The final zirconia product optionally has an average particle size of less than about 40 microns, less than about 20 microns, or less than about 10 microns.

In another embodiment, the invention is directed to a zirconia-containing composition, comprising: (a) at least about 99.9 percent tetragonal zirconia, based on the total crystalline zirconia in the zirconia-containing composition as determined by XRD, wherein the zirconia-containing composition has a substantially spherical morphology; and (b) less than 100 wppm chlorine, based on the total weight of the zirconia-containing composition, wherein the zirconia-containing composition has an average surface area of at least 80, greater than 100 or greater than about 150 $m^2/g$, and an average particle size of less than about 2 microns.

In a preferred embodiment, the zirconia-containing composition further comprises a precious metal supported by the tetragonal zirconia, the precious metal being selected from the group consisting of: platinum, silver, palladium, rhodium, gold, iridium, rhenium, osmium, alloys thereof, and mixtures thereof.

In another aspect, the zirconia-containing composition further comprises a metal supported by the tetragonal zirconia, the metal being selected from the group consisting of: cobalt, nickel, iron, copper, scandium, aluminum, neodymium, ytterbium, samarium, chromium, gadolinium and mixtures thereof. Alternatively, the zirconia-containing composition further comprises a metal supported by the tetragonal zirconia, the precious metal being selected from the group consisting of cerium, calcium, magnesium, yttrium, lanthanum and mixtures thereof.

Optionally, the zirconia-containing composition further comprises one or more additives, e.g., inert additives. The additive optionally is selected from the group consisting of alumina, silica, ceria, calcium oxide and mixtures thereof.

BRIEF DESCRIPTION OF THE DRAWINGS

The present invention will be better understood in view of the following non-limiting figures, wherein.

DETAILED DESCRIPTION OF THE INVENTION

A. Introduction

Figure 1:
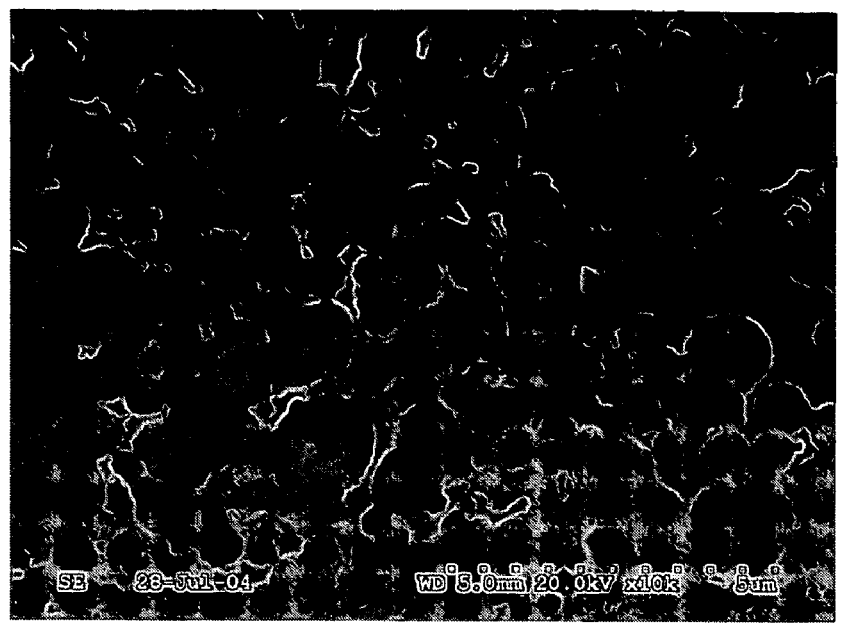
FIG. 1 presents a scanning electron micrograph (SEM) of spherical aggregates of zirconia-containing particles according to one embodiment of the present invention.

The present invention is directed to a zirconia-containing composition and to processes for making and using same. Specifically, the zirconia-containing composition comprises at least about 99.9 percent tetragonal zirconia, based on the total crystalline zirconia in the zirconia-containing composition as determined by x-ray diffraction (XRD). The zirconia-containing composition also has an average surface area of at least 80 $m^2/g$, preferably greater than about 100 $m^2/g$, and most preferably greater than about 150 $m^2/g$. The zirconia-containing composition also preferably has an average particle size of less than about 40 microns.

The high surface area tetragonal zirconia-containing compositions of the present invention are prepared by avoiding or minimizing the formation of low temperature stable monoclinic phase zirconia when making the zirconia-containing composition. Specifically, the present invention adopts a pathway of forming high surface area tetragonal zirconia directly from amorphous zirconia. This pathway allows for the formation of tetragonal zirconia without the high temperature processing typically required by conventional tetragonal zirconia synthesis processes. As a result, the tetragonal phase zirconia, which is formed under relatively mild temperature conditions according to the present invention, has an extremely high surface area.

B. Processes for Making the Zirconia-Containing Composition

In one embodiment, the present invention is directed to a process for synthesizing tetragonal zirconia. In the process, a zirconium precursor is added to a precipitation agent under conditions effective to form a first precipitant. Alternatively, the precipitation agent is added to the zirconium precursor under conditions effective to form the first precipitant. The process further comprises a digestion step in which the first precipitant in a solution is subjected to a temperature of from about 80° C. to about 120° C. for a period of time of at least 1 hour to form a digested slurry, which may comprise high surface area amorphous zirconia. The digested slurry (or an aliquot or non-aliquot portion thereof) is then spray dried to form dry amorphous zirconia, which may be calcined to form a final zirconia product. According to this process, a zirconia product can be formed comprising at least about 99.9 percent tetragonal zirconia, based on the total crystalline zirconia in the final zirconia product as determined by XRD.

According to this process, a zirconium precursor is added to a precipitation agent under conditions effective to form a first precipitant. As used herein, the term "zirconium precursor" means a zirconium-containing compound or a solution of a zirconium-containing compound. The precise composition of the zirconium precursor may vary widely. Optionally, the zirconium precursor is selected from the group consisting of: zirconyl nitrate [$ZrO(NO_3)_2$], ziconyl peroxide [$Zr(OC_3H_7)$], zirconium nitrate [$Zr(NO_3)_4$], zirconium actate [$ZrC_2H_4O_2$], zirconium carbonate [$ZrOCO_3$], ammonium zirconium carbonate [$Zr_x(NH_3)_xCH_2O_3$], solutions thereof, and mixtures thereof.

Preferably, the zirconium precursor comprises less than about 0.1 weight percent chlorine, e.g., less than about 0.05 or less than about 0.01 weight percent chlorine, based on the total weight of the zirconium precursor (exclusive of solvent, if any). These low chlorine levels advantageously allow for the formation of a final zirconia product without necessitating filtering and/or washing steps to remove chlorine.

In a preferred embodiment, the zirconium precursor is dissolved in a zirconium precursor solvent. The solution of the zirconium precursor dissolved in the zirconium precursor solvent is referred to herein as the zirconium precursor solution. The type of zirconium precursor solvent may vary depending on the nature of the selected zirconium precursor as well as the precipitation agent used and the conditions under which the zirconium precursor is added to the precipitation agent (or the conditions under which the precipitation agent is added to the zirconium precursor). Preferably, the zirconium precursor solvent is selected from the group consisting of: deionized water, ethanol, methanol, iso-popoxide and mixtures thereof. Deionized water is a particularly preferred zirconium precursor solvent.

The concentration of the zirconium precursor in the zirconium precursor solution also may vary widely depending on factors such as the nature of zirconium precursor and precipitation agent, and the operation conditions set by the spray processing step. Preferably, the concentration of the zirconium precursor is from about 0.1 to about 10 moles per liter, e.g., from about 0.1 to about 5 moles per liter or from about 0.5 to about 2 moles per liter.

As used herein, the term "precipitation agent" means a compound or solution of a compound that is capable of causing a first precipitant to form as the precipitation agent contacts the zirconium precursor. Thus, the precipitation agent should be selected for its ability to cause the first precipitant (an intermediate zirconium-containing compound) to precipitate as the zirconium precursor is added to the precipitation agent or as the precipitation agent is added to the zirconium precursor. Optionally, the precipitation agent is selected from the group consisting of ammonium hydroxide ($NH_4OH$), urea ($CO(NH_2)_2$), sodium hydroxide (NaOH), potassium hydroxide (KOH), solutions thereof, and mixtures thereof.

The precipitation agent optionally is dissolved in a precipitation agent solvent. The solution of the precipitation agent dissolved in the precipitation agent solvent is referred to herein as the precipitation agent solution. In this aspect, the solvent in which the precipitation agent is dissolved optionally is selected for its miscibility with the zirconium precursor, the zirconium precursor solvent or the zirconium precursor solution. In a preferred embodiment, the zirconium precursor solvent has the same composition as the precipitation agent solvent. Alternatively, the zirconium precursor solvent has a different composition than the precipitation agent solvent. A non-limiting exemplary list of precipitation agent solvents includes: deionized water, ethanol, methanol, isopropoxide, and mixtures thereof, with deionized water being particularly preferred.

The concentration of the precipitation agent in the precipitation agent solution may vary widely depending on factors such as the nature of the precipitation agent and the zirconium precursor, and the operation conditions set by the spray processing step. Preferably, the concentration of the precipitation agent in the precipitation agent solution is from about 1 to about 10 moles per liter, e.g., from about 2 to about 6 moles per liter or from about 3 to about 5 moles per liter. The precipitation agent solution preferably has a pH value of from about 8 to about 14.

In one embodiment of the present invention, the precipitation agent solution further comprises one or more surfactants. The presence of one or more surfactants in the precipitation agent solution is desirable because it increases the porosity (and hence the surface area) of the final zirconia product. The surfactant optionally comprises one or more of polyethylene oxide, linear alcohols, TWEEN® 80 (poly(oxyethylene)(20)-sorbitan monooleate), solutions thereof, or mixtures thereof. The precipitation agent solution optionally comprises the surfactant in an amount from about 0.05 to about 5 weight percent, e.g., from about 0.1 to about 3 weight percent or from about 0.2 to about 2 weight percent, based on the total weight of the precipitation agent solution. Additionally or alternatively, the surfactant is included in the zirconia precursor solution, optionally in the concentrations listed above with reference to the precipitation agent solution.

As indicated above, in a preferred embodiment, the zirconium precursor is added to the precipitation agent. The rate at which the zirconium precursor solution is added to the precipitation agent solution will vary widely depending on the amount of zirconium precursor and of the precipitation agent and the size of the vessels holding each. In one embodiment, the zirconium precursor solution is added dropwise to the precipitation agent solution to control the rate at which the first precipitant is formed at desired PH value. In one aspect of the invention, the flow rate of the zirconium precursor ranges from about 1 to about 10 ml/min, e.g., from about 4 to about 5 ml/min or from about 6 to about 7 ml/min.

In an alternative embodiment, the precipitation agent solution is added to the zirconium precursor solution. In this aspect of the invention, the flow rate of the precipitation agent preferably ranges from about 1 to about 50 ml/min, e.g., from about 1 to about 2 ml/min or from about 15 to about 20 ml/min.

The total amount of zirconium precursor solution that is added to the precipitation agent solution will depend on the type and amount of precipitation agent in the receiving vessel. Similarly, if the precipitation agent solution is added to the zirconium precursor solution, the total amount of precipitation agent solution that is added to the zirconium precursor solution will depend on the type and amount of the zirconium precursor solution in the receiving vessel. Preferably, the precipitation agent is provided in excess relative to the amount of zirconium precursor that is used. Preferably, the precipitation agent is provided in excess by at least about 10 weight percent, at least about 20 weight percent or at least about 50 weight percent of the total stoichiometric amount required for 100% conversion of the zirconium precursor to the first precipitant.

The conditions that are effective to form the first precipitant also may vary widely. Preferably, the conditions include a temperature ranging from about 0° C. to about 100° C., e.g., from about 4° C. to about 50° C. or from about 20° C. to about 30° C. Preferably, the addition of the zirconium precursor solution to the precipitation agent solution (or vice versa) occurs at about room temperature. The addition of the zirconium precursor to the precipitation agent (or vice versa) preferably occurs at about atmospheric pressure, although higher and lower pressures are possible.

Ideally, as the zirconium precursor solution is added to the precipitation agent solution (or as the precipitation agent is added to the zirconium precursor), the resulting mixture is vigorously mixed or stirred.

As the zirconium precursor solution is added to the precipitation agent solution (or vice versa), the pH of the resulting mixture will tend to change. Depending on the zirconium precursor and precipitation agent selected, it may be desirable to carefully monitor the mixture during this step, e.g., with a pH meter or litmus paper. In one embodiment, an additional base is added to the resulting mixture to maintain the pH of the resulting mixture greater than 9.8. Exemplary basic agents that may be added to the resulting mixture are described in more detail below.

As indicated above, as the zirconium precursor solution is added to the precipitation agent solution (or as the precipitation agent is added to the zirconium precursor) a first precipitant is formed. The chemical composition of the first precipitant will vary with the chemical compositions of the zirconium precursor and the precipitation agent selected. Without limiting the present invention to any particular reaction mechanism, in one embodiment, the first precipitant has the chemical formula ZrOH and/or $ZrO_x(OH)_y$, wherein y is less than or equal to 2x. For example, the first precipitant optionally comprises $ZrO(OH)_2$. The first precipitant optionally has an average crystal size of from about 5 nm to about 50 nm, e.g., from about 10 nm to about 35 nm.

In a preferred embodiment, the process further comprises a step of subjecting the first precipitant in a digestion solution to a temperature of from about 40° C. to about 120° C., e.g., from about 80° C. to about 90° C. or from about 100° C. to about 110° C., for a period of time of at least 1 hour, e.g., at least about 7 hours, at least about 24 hours or at least about 192 hours, to form a digested slurry, which, without limiting the present invention to any particular reaction mechanism, may include high surface area amorphous zirconia. As used herein, the term "digestion solution" means a solution or slurry comprising the first precipitant, which has not yet been digested or which is in the process of being digested. As used herein, the term "high surface area amorphous zirconia" means amorphous zirconia having a surface area greater than about 200 $m^2/g$. Typically, however, the high surface area amorphous zirconia will have a surface area greater than about 300 $m^2/g$ or greater than about 400 $m^2/g$. In terms of ranges, the high surface area amorphous zirconia preferably has a surface area ranging from about 200 $m^2/g$ to about 600 $m^2/g$, e.g., from about 400 $m^2/g$ to about 600 $m^2/g$. The digestion solution preferably comprises the precipitant formed in the adding step and a mixture of the zirconia precursor solvent and the precipitation agent solvent. This step, also referred to herein as "digestion," may cause the first precipitant to convert to a high surface area amorphous zirconia structure, which preferably has a surface area ranging from about 200 $m^2/g$ to about 600 $m^2/g$, e.g., from about 300 $m^2/g$ to about 500 $m^2/g$ or from about 350 $m^2/g$ to about 450 $m^2/g$. Without limiting the invention to any particular reaction mechanism, the digestion step is believed to enhance the formation of surface bonds between particles by condensation of surface hydroxyl groups. Additionally, the digestion step may cause dissolution and re-precipitation of material, which helps in strengthening the network of particles.

If left unaltered, the pH of the digestion solution will tend to decrease during digestion. Preferably, the pH of the digestion solution is maintained at a pH of from about 8 to about 14, e.g., from about 8 to about 12 or from about 8.8 to about 10.8. In a preferred embodiment, the digestion solution is maintained at a pH of about 9.8. It is desirable to maintain the pH of the digestion solution within these ranges in order to maintain desirable properties of the zirconium hydroxide and/or $ZrO_x(OH)_y$ precipitant. The pH of the digestion solution may be maintained within these ranges, for example, by carefully monitoring the pH of the digestion solution, e.g., with a pH meter or litmus paper, and periodically adding a basic agent to the digestion solution. A non-limiting exemplary list of basic agents that may be added to the digestion solution during digestion include: ammonium hydroxide ($NH_4OH$), potassium hydroxide (KOH), sodium hydroxide (NaOH), Urea [$CO(NH_2)_2$] solutions thereof and mixtures thereof. In a preferred embodiment, the basic agent comprises the same composition as the precipitation agent, although possibly in a different concentration. A preferred basic agent comprises a 30 weight percent ammonium hydroxide solution in water. The rate at which the basic agent is added to the digestion solution will vary depending on the digestion conditions, the composition of the digestion solution, the concentration of the basic agent and other factors. Optionally, the basic agent is added to the digestion solution at a rate of from about 1 to about 50 ml/hour, e.g., from about 1 to about 2 ml/hour or from about 15 to about 20 ml/hour.

As indicated above, in one embodiment, the invention is directed to processes for making a high surface area tetragonal zirconia composition having a metal or metal oxide supported thereon. Such compositions may be used as catalysts in various processes. By "supported" it is meant that the metal or metal oxide is situated on at least a portion of a zirconia surface (e.g., on an external surface or an internal (pore) surface). It is contemplated, however, that a portion of the metal or metal oxide may be situated within and/or throughout the interior regions of the zirconia.

In this aspect of the invention, the process optionally further comprises the step of adding a metal precursor solution comprising a metal precursor to the digested slurry (e.g., to the high surface area amorphous zirconia) formed in or after the digestion step, either before or after the drying step. As used herein, the term "digested slurry" means a slurry that has been digested (as discussed in detail above), the slurry optionally comprising high surface area amorphous zirconia, which amorphous zirconia has not been dried or calcined. Alternatively, the metal precursor or metal precursor solution is added to the digestion solution (e.g., during digestion). As used herein, the term "metal precursor" means a compound comprising a metal, optionally in solution, wherein the compound is not an elemental metal. "Metal precursor solution" means a solution comprising a metal precursor solvent and a compound comprising a metal, wherein the compound is not an elemental metal. Preferably, the metal precursor is selected from the group consisting of a metal nitrate, a metal acetate, a metal carbonate, a metal alkoxide, a metal hydroxide and mixtures thereof. The choice of the metal precursor solvent may vary widely. A non-limiting list of solvents that may be used as the metal precursor solvent includes: deionized water, ethanol, methanol, iso-propoxide, and mixtures thereof, with deionized water being particularly preferred.

In various possible embodiments, the metal precursor or metal precursor solution is added to the zirconium precursor solution, to the precipitation agent solution, and/or to the first precipitant in the digestion solution (after the contacting of the zirconium precursor with the precipitation agent) prior to the digestion step. The timing of the addition of the metal precursor in this embodiment may vary depending on the digestion conditions, the concentration of the metal precursor solution and other factors. Thus, in various aspects, the metal precursor may added, at least partially, to the digestion solution before or during digestion, to the digested slurry after digestion, or to a portion thereof. Thus, the solution to which the metal precursor solution is added may or may not include high surface area amorphous zirconia.

In another embodiment, all or a portion of the liquids in the digestion solution or the digested slurry are separated from the first precipitant and/or the high surface area amorphous zirconia contained therein, e.g., by decanting, filtering or other means, prior to the adding of the metal precursor solution to the digestion solution or the digested slurry. This embodiment is preferred if it is desired to form the metal on the outer surface of the zirconia rather than form the metal throughout the final zirconia particles. Depending on the metal precursor selected, the timing of the adding of the metal precursor and the subsequent calcining conditions, the final product formed may comprises high surface area tetragonal zirconia having the elemental metal supported thereon, having the corresponding metal oxide supported thereon, or having a mixture of the two supported thereon.

The concentration of the metal precursor in the metal precursor solution prior to its addition to the zirconium precursor, to the precipitation agent, to the digestion solution, or to the digested slurry, may vary widely. In one aspect, the concentration of the metal precursor in the metal precursor solution ranges from about 0.01 to about 5 moles per liter, e.g., from about 0.1 to about 5 moles per liter or from about 0.5 to about 2 moles per liter.

In this aspect of the invention, the metal precursor optionally comprises a precious metal. It is desirable to form a high surface area tetragonal zirconia composition having a precious metal supported thereon because, for example, such compositions are active and stable as water gas shift catalysts over a wide temperature range. In this aspect of the invention, the metal precursor optionally comprises a precious metal selected from the group consisting of: platinum, silver, palladium, rhodium, gold, iridium, rhenium, osmium, alloys thereof, and mixtures thereof. In this embodiment, the concentration of the precious metal precursor in the metal precursor solution preferably ranges from about 0.01 to about 1 moles per liter, e.g., from about 0.1 to about 1 moles per liter or from about 0.1 to about 0.5 moles per liter.

After the optional step of adding the metal precursor solution to digestion solution, to the digested slurry (to the high surface area amorphous zirconia), or to a portion thereof, the resulting mixture is dried, e.g., through spray drying, to form a dry powder, which is calcined to form the final zirconia product. The final zirconia product optionally comprises the precious metal in an amount of from about 0.1 to about 10 weight percent, e.g., from about 0.3 to about 5 weight percent, based on the total weight of the final zirconia product.

Additionally or alternatively, the metal precursor optionally comprises a non-precious metal selected from the group consisting of cobalt, nickel, iron, copper, scandium, aluminum, neodymium, ytterbium, samarium, chromium, gadolinium, and mixtures thereof. In another embodiment, the metal precursor is selected from the group consisting of cerium, calcium, magnesium, yttrium, lanthanum and mixtures thereof. Other metal precursors may comprise a metal selected from the group consisting of: ruthenium, titanium, vanadium, manganese, tungsten, zinc, niobium, molybdenum and tin. In these embodiments, the concentration of the metal precursor in the metal precursor solution preferably ranges from about 0.1 to about 10 moles per liter, e.g., from about 0.1 to about 5 moles per liter or from about 0.5 to about 3 moles per liter.

During one or more of the drying step and/or the calcining step, the non-precious metal precursor preferably converts to the corresponding metal oxide, which typically is well-mixed with the zirconia. In contrast, the precious metal precursor preferably converts to the corresponding elemental metal, which ideally is supported primarily on an outer surface of the tetragonal zirconia (rather than being well-mixed with the tetragonal zirconia). Optionally, the final zirconia product comprises the non-precious metal (which may or may not be in the form of a metal oxide) in an amount of from about 1 to about 50 weight percent, e.g., from about 1 to about 20 weight percent, based on the total weight of the final zirconia product.

A non-limiting list of exemplary precious and non-precious metal precursors is provided in Table I.

TABLE I

METAL PRECURSORS

| Target Metal | Metal Precursors |
|---|---|
| Platinum | Platinum (II) Acetylacetonatetetraamineplatinum (II) nitrate ($Pt(NH_3)_4(NO_3)_2$); hydroxoplatinic acid ($H_2Pt(OH)_6$); platinum nitrates; platinum amine nitrates; platinum diamine nitrates (e.g. $Pt(NH_3)_4(NO_3)_2$); sodium hexahydroxyplatinum ($Na_2Pt(OH)_6$); potassium hexahydroxyplatinum ($K_2Pt(OH)_6$); Platinum (IV) Ethanolamine; and Platinum Nitrate |
| Palladium | palladium (II) nitrate ($Pd(NO_3)_2$); palladium acetate, palladium acetylacetonate; palladium hydroxide; pallaium nitrate; palladium oxalate; $Pd(NH_3)_2(OH)_2$ and palladium carboxylates |
| Ruthenium | Ruthenium acetylacetonate; ruthenium β-diketonates; ruthenium nitrosyl nitrate ($Ru(NO)(NO_3)_3$); potassium perruthenate ($K_3RuO_4$); sodium perruthenate ($Na_3RuO_4$); $(NH_4)_3Ru_2O_7$; $NH_4Ru_2O_7$; $Ru_3(CO)_{12}$ |
| Gold | Gold acetate; gold hydroxide |
| Copper | Copper carbonate; copper oxalate; copper acetate; copper formate; copper carboxylates; copper acetate($Cu(OOCH_3)_2$); copper nitrate ($Cu(NO_3)_2$) |
| Rhodium | Rhodium acetate and rhodium nitrate ($Rh(NO_3)_3$) |
| Titanium | Titanium oxide, Titanium Oxalate, Titanium (IV) Isopropoxide |
| Vanadium | Ammonium vanadium oxide ($NH_4VO_3$) |
| Manganese | Manganese (II) acetate hydrate ($MN(OOCCH_3)_2 \cdot xH_2O$); manganese (III) acetate hydrate ($Mn(OOCCH_3)_2 \cdot xH_2O$); manganese nitrate ($Mn(NO_3)_2$) and potassium permangate ($KMNO_4$) |
| Iron | Iron acetate ($Fe(OOCCH_3)_2$); iron nitrate hydrate ($Fe(NO_3)_3 \cdot xH_2O$) |
| Cobalt | Cobalt acetate hydrate ($Co(OOCCH_3)_2 \cdot xH_2O$); and cobalt nitrate hydrate ($Co(NO_3)xH_2O$) |
| Tungsten | Ammonium tungsten oxide ($(NH4)_{10}W_{12}O_{41}$) |
| Zinc | Zinc acetate ($Zn(OOCCH_3)_2 \cdot xH_2O$); zinc formate ($Zn(OOCH)_2$) and zinc nitrate hydrate ($Zn(NO_3)_2 \cdot xH_2O$) |
| Niobium | Niobium hydride (NbH) |
| Molybdenum | molybdenum chloride; molybdenum hexacarbonyl ($Mo(CO)_6$); ammonium paramolybdate ($(NH_4)Mo_7O_{24} \cdot xH_2O$); ammonium molybdate ($(NH_4)_2Mo_2O_7$) and molybdenum acetate dimer ($Mo[(OCOCH_3)_2]_2$) |
| Tin | Tin (II) Formate, Tin acetate, Tin methoxide, Tin isopropoxide, Tin oxalate |
| Osmium | Osmium carbonyl [$Os_3(CO)_{12}$], dicyclopentadienyl Osmium [$Os(C_5H_5)_2$] |
| Silver | complex silver salts ($[Ag(RNH_2)_2]^+$, $[Ag(R_2NH)_2]^+$, $[Ag(R_3N)_2]^+$ where R = aliphatic or aromatic; $[Ag(L)_x]^+$ where L = ziridine, pyrrol, indol, piperidine, pyridine, aliphatic substituted and amino substituted pyridines, imidazole, pyrimidine, piperazine, triazoles, etc.; $[Ag(L)_x]^+$ where L = ethanolamine, glycine, gormamides, acetamides or acetonitrile); Silver nitrate ($AgNO_3$); Silver nitrite ($AgNO_2$); Silver oxide ($Ag_2O$, AgO); Silver carbonate ($Ag_2CO_3$); Silver oxalate ($Ag_2C_2O_4$); Silver trispyrazolylborate ($Ag[(N_2C_3H_3)_3]BH$); Silver tris(dimethylpyrazolyl)borate ($Ag[((CH_3)_2N_2C_3H_3)_3]BH$); Silver azide ($AgN_3$); Silver tetrafluoroborate ($AgBF_4$); Silver acetate ($AgO_2CCH_3$); Silver propionate ($AgO_2CC_2H_5$); Silver butanoate ($AgO_2CC_3H_7$); Silver ethylbutyrate ($AgO_2CCH(C_2H_5)C_2H_5$); Silver pivalate ($AgO_2CC(CH_3)_3$); Silver cyclohexanebutyrate ($AgO_2C(CH_2)_3C_6H_{11}$); Silver ethylhexanoate ($AgO_2CCH(C_2H_5)C_4H_9$); Silver neodecanoate ($AgO_2CC_9H_{19}$); Silver trifluoroacetate ($AgO_2CCF_3$); Silver pentafluoropropionate ($AgO_2CC_2F_5$); Silver heptafluorobutyrate ($AgO_2CC_3F_7$); Silver trichloroacetate ($AgO_2CCCl_3$); Silver 6,6,7,7,8,8,8-heptafluoro-2,2-dimethyl-3,5-octanedionate |

TABLE I-continued

METAL PRECURSORS

| Target Metal | Metal Precursors |
|---|---|
| | (AgFOD); Silver lactate ($AgO_2CH(OH)CH_3$); Silver citrate ($Ag_3C_6H_5O_7$); Silver glycolate ($AgOOCCH(OH)CH_3$); Silver benzoate ($AgO_2CCH_2C_6H_5$); Silver phenylacetate ($AgOOCCH_2C_6H_5$); Silver nitrophenylacetates ($AgOOCCH_2C_6H_4NO_2$); Silver dinitrophenylacetate ($AgOOCCH_2C_6H_3(NO_2)_2$); Silver difluorophenylacetate ($AgOOCCH_2C_6H_3F_2$); Silver 2-fluoro-5-nitrobenzoate ($AgOOCC_6H_3(NO_2)F$); Silver acetylacetonate ($Ag[CH_3COCH=C(O-)CH_3]$); Silver hexafluoroacetylacetonate ($Ag[CF_3COCH=C(O-)CF_3]$); Silver trifluoroacetylacetonate ($Ag[CH_3COCH=C(O-)CF_3]$); Silver tosylate ($AgO_3SC_6H_4CH_3$); Silver triflate ($AgO_3SCF_3$); Silver sterate; Silver oleate; Silver dodecanoate |
| Nickel | Ni-nitrate ($Ni(NO_3)_2$); Ni-sulfate ($NiSO_4$); Nickel ammine complexes ($[Ni(NH_3)_6]^{n+}$ (n = 2, 3)); Ni-tetrafluoroborate ($Ni(BF_4)_2$); Ni-oxalate; Ni-isopropoxide ($Ni(OC_3H_7)_2$); Ni-methoxyethoxide ($Ni(OCH_2CH_2OCH_3)_2$); Ni-acetylacetonate ($[Ni(acac)_2]_3$ or $Ni(acac)_2(H_2O)_2$); Ni-hexafluoroacetylacetonate ($Ni[CF_3COCH=C(O-)CF_3]_2$); Ni-formate ($Ni(O_2CH)_2$); Ni-acetate ($Ni(O_2CCH_3)_2$); Ni-octanoate ($Ni(O_2CC_7H_{15})_2$); Ni-ethylhexanoate ($Ni(O_2CCH(C_2H_5)C_4H_9)_2$); Ni-trifluoroacetate ($Ni(OOCCF_3)_2$) |
| Iridium | Iridium nitrate, iridium acetate, |
| Rhenium | Rhenium nitrate, rhenium acetate |
| Scandium | Scandium nitrate, scandium acetate |
| Aluminum | Aluminum nitrate, aluminum acetate |
| Neodymium | Neodymium nitrate, neodymium acetate |
| Ytterbium | Ytterbium nitrate, ytterbium acetate |
| Samarium | Samarium nitrate, samarium acetate |
| Chromium | Chromium nitrate, chromium acetate |
| Gadolinium | Gadolinium nitrate, gadolinium acetate |
| Cerium | Cerium nitrate, cerium acetate |
| Calcium | Calcium nitrate, calcium acetate |
| Magnesium | Magnesium nitrate, magnesium acetate |
| Yttrium | Yttrium nitrate, yttrium acetate |
| Lanthanum | Lanthanum nitrate, lanthanum acetate |

In another embodiment of the present invention, the metal precursor is added to a slurry formed from the final zirconia product. In this aspect of the invention, a slurrying agent such as water is added to the final zirconia product according to the present invention, and the metal precursor is added to the slurry. The resulting slurry (which includes the metal precursor) is dried and calcined in order to form a metal or metal oxide supported on a surface of the final zirconia product. The drying step optionally is achieved by any of the spray processing methods described herein. Thus, in this embodiment, the process further comprises the steps of: adding a slurrying agent such as water to tetragonal zirconia powder (e.g., to the final zirconia product) to form a slurry; adding a metal precursor solution comprising a metal precursor to the slurry to form a metal-containing slurry; drying the metal-containing slurry to form a dry zirconia composition supporting a metal or metal oxide; and calcining the dry zirconia composition to form a final zirconia composition comprising a zirconia composition that supports the metal. The amount of slurrying agent added to the tetragonal zirconia powder will vary depending on the type of slurrying agent used. In this embodiment, the step of drying the slurry optionally comprises spray drying the slurry. Alternatively, the steps of drying of the slurry and calcining the dry zirconia composition optionally occur simultaneously through spray pyrolysis. The types of metal precursors and the relative amount of metal ultimately supported on the zirconia are as described above.

In one aspect of the invention, an additive, e.g., an inert additive, is added to the digestion solution (prior to or during digestion), to the digested slurry, or to a portion thereof. The additive may help in maintaining desired properties, such as phase composition, porosity and surface area, in the final zirconia product. In this aspect, the additive optionally comprises a suspension comprising a component selected from the group consisting of alumina, silica, ceria, calcium oxide and mixtures thereof. Typically, the additive will be well-mixed within the tetragonal zirconia in the final zirconia product. Ultimately, in this aspect, a final zirconia product is formed that comprises the additive in an amount less than about 50 weight percent, e.g., less than about 20 weight percent or less than about 10 weight percent, based on the total weight of the final zirconia product (including the additive).

In another aspect of the invention, the additive is added to a slurry formed from the final zirconia product rather than during the synthesis of the final zirconia product, e.g., during or immediately after digestion. In this aspect of the invention, a slurrying agent such as water is added to the final zirconia product formed according to the present invention. In contrast to the above-described embodiment in which the additive is added to the digestion solution, to the digested slurry, or to a portion thereof, the additive will not be well-mixed within the tetragonal zirconia in the final zirconia product formed from this aspect of the invention. Instead, the resulting slurry is dried and calcined in order to form a final zirconia product that has the additive supported primarily on the outer surfaces thereof. The drying step optionally is achieved by any of the spray processing methods described herein or in a vacuum oven. The steps of drying of the slurry and calcining the zirconia composition optionally occur simultaneously through spray pyrolysis, as with the above-described embodiments.

The tetragonal zirconia compositions formed according to the present invention are preferably fabricated by spray drying or spray pyrolysis methods, which are collectively referred to herein as spray processing methods. A major attribute of this approach is the ability to fabricate compositions and microstructures that cannot be easily fabricated, if at all, by other powder manufacturing methods, combined with the ability to economically produce high volumes of zirconia compositions. The flexibility to fabricate unique combinations of compositions and microstructures comes from the fact that spray processing combines aspects of both liquid phase and solid state processing.

Spray processing generally includes the step of providing a precursor composition, typically in a flowable liquid form. As used herein, the term "precursor composition" means a composition comprising solids (e.g., high surface area amorphous zirconia) formed in the digestion step dispersed in a fluid medium. In a preferred embodiment, the precursor composition comprises or consists essentially of the digested slurry, or of a portion (aliquot or non-aliquot) thereof. The fluid medium preferably comprises one or more of the following: the zirconium precursor, the zirconium precursor solvent, the precipitation agent, the first precipitant, the precipitation agent solvent, one or more basic agents, an additive, one or more components that were present in the digestion solution or the digested slurry, and/or an additive solvent. Additionally or alternatively, the fluid medium optionally includes the metal precursor, the metal precursor solution and/or the metal solvent. In another aspect, the solids in the digested slurry are substantially separated from the liquids in digested slurry, and a separate liquid medium is added to the separated solids to form a precursor composition having highly desirable spray processing characteristics. Examples of such separate liquid mediums include any of the above disclosed solvents.

During spray processing, the precursor composition is atomized to form a suspension of liquid precursor droplets. The liquid is removed from the liquid precursor droplets, optionally by heating, to form the dry amorphous zirconia, which comprises high surface area amorphous zirconia. As used herein the term "dry amorphous zirconia" means particles comprising high surface area amorphous zirconia and less than about 40 weight percent liquids, based on the total weight of the dry amorphous zirconia. Preferably, the dry amorphous zirconia comprises less than about 20 or less than about 5 weight percent liquids, based on the total weight of the dry amorphous zirconia. If the liquid medium comprises a metal precursor, the metal precursor preferably is chemically converted into an elemental metal and/or to an oxide thereof supported on a surface of the dry amorphous zirconia.

It may be desired to form a zirconia composition having a high level of porosity or crystallinity. In this aspect, it may be advantageous to include a morphology enhancing agent in the precursor composition to enhance the porosity or crystallinity of the resulting dry amorphous zirconia and of the ultimately resulting final zirconia product. Preferably, the morphology enhancing agents are added to the digestion solution (before or during digestion) and/or to the digested slurry. Morphology enhancing agents can be selected from urea, acetic acid, lactic acid, glycine, alcohols, ammonium nitrate, polymers, polyvinylalcohol and carbohydrazide. The amount of morphology enhancing agent in the precursor composition can preferably be varied from about 0.1 vol. % to about 40 vol. %, based on the total volume of the precursor medium.

The spray processing methods can combine the drying of the digested slurry to form the dry amorphous zirconia and the calcination of the dry amorphous zirconia to the final zirconia product in one step, e.g., where both the removal of the solvent(s) and the conversion of a dry amorphous zirconia occur essentially simultaneously. This method is referred to as "spray pyrolysis." In another embodiment, the spray processing method achieves the drying of the amorphous zirconia and possibly a conversion of $ZrO_x(OH)_y$ to amorphous zirconia. The complete conversion to the final zirconia product can occur in a second step. This second step is referred to herein as post-processing calcination.

Thus, spray drying or spray conversion can be followed by heating or calcination. By varying reaction time, temperature and type of additives in the precursor composition, the spray processing methods can produce powder morphologies and zirconia microstructures that yield improved performance due to the introduction of more advanced structure. In general, large pore volumes and proper pore diameter are examples of such advanced structures.

If the precursor composition comprises a metal precursor, the corresponding elemental metal and/or metal oxide preferably is formed during the spray processing step, e.g., either during spray drying or spray pyrolysis. Specifically, during the spray processing step and optionally during the calcination step, the metal precursor comes in intimate contact with an outer surface of one or more of: the first precipitant, the amorphous zirconia (e.g., wet), the dry amorphous zirconia and/or the final zirconia product. As the fluid medium in the precursor composition is removed during the drying step, the metal precursor is reduced to form its corresponding elemental metal and/or oxide thereof. Ideally, the elemental metal or oxide thereof is supported on the outer surface of the dry amorphous zirconia.

Preferably, the conversion of the solids in the precursor medium (derived from the digested slurry) to the dry amorphous zirconia occurs generally at the same time as the formation of the elemental metal or metal oxide from the metal precursor. That is, these two steps may occur simultaneously. It is contemplated, however, that the formation of the elemental metal or oxide thereof from the metal precursor may occur at the same time as the conversion of the dry amorphous zirconia to the final zirconia product. It is also possible (particularly if the process includes a spray pyrolysis step) that the formation of the elemental metal or oxide thereof may occur during both steps, e.g., during conversion of the solids in the precursor medium to the dry amorphous zirconia and during conversion of the dry amorphous zirconia to the final zirconia product.

Ideally, the metal precursor is rapidly reacted on the surface of the amorphous zirconia and/or on the surface of the dry amorphous zirconia to form the elemental metal or metal oxide. The reaction of the metal precursor to form the elemental metal or metal oxide preferably occurs over a very short period of time such that the growth of large active metal clusters or dense metal oxide is limited. Preferably, the metal precursor is exposed to an elevated reaction temperature of from about 200° C. to about 900° C., e.g., from about 500° C. to about 800° C. or from about 600° C. to about 750° C. for not more than about 600 seconds, more preferably not more than about 100 seconds and even more preferably not more than about 10 seconds, to form the elemental metal and/or metal oxide. Under these conditions, a plurality of metal crystallites (preferably precious metal crystallites) may be formed on the outer surface of tetragonal zirconia in the final zirconia product. The metal crystallites preferably have an average crystal size of from about 1 nm to about 10 nm, e.g., from about 1 nm to about 5 nm or from about 1 nm to about 3 nm.

Preferably, the spray processing methods are capable of forming a spherical particle structure. The spherical particles form as a result of the formation and drying of the precursor droplets during spray processing.

Spray processing methods for the production of the zirconia product can be grouped by reference to several different attributes of the apparatus used to carry out the method. These attributes include: the main gas flow direction (vertical or horizontal); the type of atomizer (submerged ultrasonic, ultrasonic nozzle, two-fluid nozzle, single nozzle pressurized fluid); the type of gas flow (e.g., laminar with no mixing, turbulent with no mixing, co-current of droplets and hot gas, countercurrent of droplets and gas or mixed flow); the type of heating (e.g., hot wall system, hot gas introduction, combined hot gas and hot wall, plasma or flame); and the type of powder collection system (e.g., cyclone, bag house, electrostatic or settling).

The zirconia product of the present invention can be prepared by starting with a precursor composition comprising the digested slurry (or an aliquot or non-aliquot portion thereof, optionally comprising amorphous zirconia, and the liquid medium, as discussed above. The precursor composition is atomized to form an aerosol of droplets, each preferably comprising an aliquot portion of the precursor composition. Thus, each droplet preferably comprises the amorphous zirconia and the liquid medium. The processing temperature of the droplets can be controlled so the optional metal precursor decomposes to form the corresponding elemental metal during the drying step.

The first step in the process is the vaporization of the liquid medium as each droplet is heated. The vaporization of the liquid medium converts each droplet to a particle (the dry amorphous zirconia) comprising dried solids (optionally including high surface area amorphous zirconia) and optionally one or more metal salts. A number of methods to deliver heat to the particles are possible: horizontal hot-wall tubular reactors, spray dryer and vertical tubular reactors can be used, as well as plasma, flame and laser reactors. Horizontal hot-wall tubular reactors are disclosed in U.S. Pat. No. 6,103,393 by Kodas et al., the entirety of which is incorporated herein by reference. Spray dryers are disclosed, for example, in U.S. Pat. No. 5,615,493 by Funder and U.S. Pat. No. 5,100,509 by Pisecky et al., the entireties of which are incorporated herein by reference. A plasma reactor is disclosed in U.S. Pat. No. 6,689,192 by Phillips et al. and a flame reactor is disclosed in U.S. Pat. No. 5,958,361 by Laine et al., the entireties of which are incorporated herein by reference. Laser reactors are disclosed in U.S. Pat. No. 6,248,216 by Bi et al., the entirety of which is incorporated herein by reference.

As the particles experience either higher temperature or longer time at a specific temperature, the optional metal precursor decomposes. Preferably, the time that the droplets/particles experience a given temperature can be controlled and therefore the degree of porosity, crystallinity, the microstructure and other properties can also be controlled.

The atomization technique for generating the droplets has a significant influence over the characteristics of the zirconia product, such as the particle surface area, porosity, the particle size distribution (PSD), as well as the production rate of the zirconia powder. In extreme cases, some techniques cannot atomize fluids with even moderate particle loadings or high viscosities. Several methods exist for the atomization of a liquid comprising suspended particulates. These methods include but are not limited to: ultrasonic transducers (usually at a frequency of 1-3 MHz); ultrasonic nozzles (usually at a frequency of 10-150 KHz); rotary atomizers; two-fluid nozzles; and pressure atomizers.

Ultrasonic transducers are generally submerged in a liquid and the ultrasonic energy produces atomized droplets on the surface of the liquid. Two basic ultrasonic transducer disc configurations, planar and point source can be used. Deeper fluid levels can be atomized using a point source configuration since the energy is focused at a point that is some distance above the surface of the transducer. The scale-up of submerged ultrasonic transducers can be accomplished by placing a large number of ultrasonic transducers in an array. Such a system is illustrated in U.S. Pat. No. 6,103,393 by Kodas et al. and U.S. Pat. No. 6,338,809 by Hampden-Smith et al., and the disclosure of each of these U.S. Patents is incorporated herein by reference in its entirety.

Scale-up of nozzle systems can be accomplished by either selecting a nozzle with a larger capacity or by increasing the number of nozzles used in parallel. Typically, the droplets produced by nozzles are larger than those produced by ultrasonic transducers. Particle size is also dependent on the gas flow rate. For a fixed liquid flow rate, an increased airflow decreases the average droplet size and a decreased airflow increases the average droplet size. It is difficult to change droplet size without varying the liquid or airflow rates. However, two-fluid nozzles have the ability to process larger volumes of liquid per time than ultrasonic transducers.

Ultrasonic spray nozzles also use high frequency energy to atomize a fluid. Ultrasonic spray nozzles have some advantages over single or two-fluid nozzles such as the low velocity of the spray leaving the nozzle and lack of associated gas flow. The nozzles are available with various orifice sizes and orifice diameters that allow the system to be scaled for the desired production capacity. In general, higher frequency nozzles are physically smaller, produce smaller droplets, and have a lower flow capacity than nozzles that operate at lower frequencies. A drawback of ultrasonic nozzle systems is that scaling up the process by increasing the nozzle size increases the average particle size. If a particular particle size is required, then the maximum production rate per nozzle is set. If the desired production rate exceeds the maximum production rate of the nozzle, additional nozzles or additional production units are required to achieve the desired production rate.

The shape of the atomizing surface determines the shape and spread of the spray pattern. Conical, microspray and flat atomizing surface shapes are available. The conical atomizing surface provides the greatest atomizing capability and has a large spray envelope. The flat atomizing surface provides almost as much flow as the conical surface but limits the overall diameter of the spray. The microspray atomizing surface is for very low flow rates where narrow spray patterns are needed. These nozzles are preferred for configurations where minimal gas flow is required in association with the droplets.

The solids in the precursor composition may present several problems with respect to atomization. For example, submerged ultrasonic atomizers re-circulate the suspension through the generation chamber and the suspension concentrates over time. Further, some fraction of the liquid atomizes without carrying the suspended particulates. Other problems encountered when using submerged ultrasonic transducers is that the transducer discs can become coated with the particles and or precursor over time. Further, the generation rate of particulate suspensions can be very low using submerged ultrasonic transducer discs. This is due in part to energy being absorbed or reflected by the suspended particles.

For spray drying, the aerosol can be generated using three basic methods. These methods differ in the type of energy used to break the liquid masses into small droplets. Rotary atomizers (utilization of centrifugal energy) make use of spinning liquid droplets off of a rotating wheel or disc. Rotary atomizers are useful for co-current production of droplets in the range of 20 μm to 150 μm in diameter. Pressure nozzles (utilization of pressure energy) generate droplets by passing a fluid under high pressure through an orifice. These can be used for both co-current and mixed-flow reactor configurations and typically produce droplets in the size range of 50 μm to 300 μm. Multiple fluid nozzles such as a two-fluid nozzle produce droplets by passing a relatively slow moving fluid through an orifice while shearing the fluid stream with a relatively fast moving gas stream. As with pressure nozzles, multiple fluid nozzles can be used with both co-current and mixed-flow spray dryer configurations. This type of nozzle can typically produce droplets in the size range of 5 μm to 200 μm.

For example, two-fluid nozzles are used to produce aerosol sprays in many commercial applications, typically in conjunction with spray drying processes. In a two-fluid nozzle, a low-velocity liquid stream encounters a high-velocity gas stream that generates high shear forces to accomplish atomization of the liquid. A direct result of this interaction is that the droplet size characteristics of the aerosol are dependent on the relative mass flow rates of the liquid precursor and nozzle gas stream. The velocity of the droplets as they leave the generation zone can be quite large which may lead to unacceptable losses due to impaction. The aerosol also leaves the nozzle in a characteristic pattern, typically a flat fan, and this may require that the dimensions of the reactor be sufficiently large to prevent unwanted losses on the walls of the system.

Thus, numerous atomization techniques for spray processing are possible for the production of the zirconia products of the present invention, and different versions are preferred for different feed streams and products.

The atomized precursor composition should be heated to remove the liquid medium (including solvents) and react the metal precursor, if present, to its elemental metal form. For example, a horizontal, tubular hot-wall reactor can be used to heat a gas stream to a desired temperature. Energy is delivered to the system by maintaining a fixed boundary temperature at the wall of the reactor and the maximum temperature of the gas is the wall temperature. Heat transfer within a hot wall reactor occurs through the bulk of the gas. Buoyant forces that occur naturally in horizontal hot wall reactors aid this transfer. The mixing also helps to improve the radial homogeneity of the gas stream. Passive or active mixing of the gas can also increase the heat transfer rate. The maximum temperature and the heating rate can be controlled independent of the inlet stream with small changes in residence time. The heating rate of the inlet stream can also be controlled using a multi-zone furnace.

The use of a horizontal hot-wall reactor according to the present invention is generally preferred to produce particles with a size of not greater than about 5 μm. Above about 5 μm, settling of particles can cause significant material losses. One disadvantage of such reactors is the poor ability to atomize particulates when using submerged ultrasonics for atomization.

Alternatively, the horizontal hot-wall reactor can be used with a two-fluid nozzle to atomize the droplets. This approach is preferred for precursor feed streams containing higher levels of particulate materials, such as a particulate support precursor. A horizontal hot-wall reactor can also be used with ultrasonic nozzle atomization techniques. This allows atomization of a precursor containing particulates, however the large droplet size leads to losses of materials on reactor walls and other surfaces making this an expensive method for powder production.

While horizontal hot-wall reactors are specifically useful for some particle morphologies and compositions according to the present invention, particularly for the spray pyrolysis method, spray processing systems in the configuration of a spray dryer are the preferred production method for large quantities of absorbent powders in accordance with some applications of the present invention.

Spray drying is a process wherein powders are produced by atomizing a precursor composition to produce droplets and vaporizing the liquid medium in the precursor composition to produce a dry aerosol comprising the dry amorphous zirconia. Thermal decomposition of one or more optional metal precursors may take place during this step to produce a zirconia-supported metal composition. The residence time in the spray dryer is the average time the process gas spends in the drying vessel as calculated by the vessel volume divided by the process gas flow using the outlet gas conditions. The peak excursion temperature (the reaction temperature) in the spray dryer is the maximum temperature of a particle, averaged throughout its diameter, while the particle is being processed and/or dried. The droplets are heated by supplying a pre-heated carrier gas.

Three types of spray dryer systems are useful for the spray drying of the solids in the precursor composition according to the present invention. An open system is useful for spray drying of powders (amorphous zirconia) using air as an aerosol carrier gas and a liquid medium comprising an aqueous feed solution. A closed system is useful for spray drying of powders (amorphous zirconia) using an aerosol carrier gas other than air. A closed system is also useful when using a liquid medium comprising a non-aqueous or a semi-non-aqueous solution. A semi-closed system, including a self-inertizing system, is useful for spray drying of powders (amorphous zirconia) that require an inert atmosphere and/or liquid mediums that are potentially flammable.

Two spray dryer designs are particularly useful for the production of the zirconia product of the present invention. A co-current spray dryer is useful for the production of materials that are sensitive to high temperature excursions (e.g., greater than about 350° C.) or that require a rotary atomizer to generate the aerosol. Mixed-flow spray dryers are useful for producing materials that require relatively high temperature excursions (e.g., greater than about 350° C.) or require turbulent mixing forces.

In a co-current spray dryer, the hot gas is introduced at the top of the unit where the droplets are generated with any of the atomization techniques mentioned above. The maximum temperature that a droplet/particle is exposed to in a co-current spray dryer is the temperature of the outlet. Typically, the outlet temperature is limited to about 200° C., although some designs allow for higher temperatures. In addition, since the particles experience the lowest temperature in the beginning of the time-temperature curve and the highest temperature at the end, the possibility of precursor surface diffusion and agglomeration is high.

A preferred spray processing system according to the present invention is based on a mixed-flow spray dryer. A mixed-flow spray dryer introduces the hot gas at the top of the unit and the aerosol is generated near the bottom and is directed upwardly. The droplets/particles are forced towards the top of the unit then fall and flow back down with the gas, increasing the residence time in the spray dryer. The temperature the particles experience is also higher as compared to a co-current spray dryer. This is important, as most spray dryers are not capable of reaching the higher temperatures that are required for the conversion of some metal precursors to their corresponding elemental metal.

For mixed flow spray dryers the reaction temperatures can be high enough for the decomposition of the optional metal precursor. The highest temperature in these spray dryers is the inlet temperature (e.g., 600° C. and higher), and the outlet temperature can be as low as 90° C. Therefore, the particles reach the highest temperature for a relatively short time, which advantageously reduces precursor migration or surface diffusion. This spike of high temperature quickly converts the optional metal precursor and is followed by a mild quench since the spray dryer temperature quickly decreases after the maximum temperature is achieved. The spike-like temperature profile is advantageous for the generation of highly dispersed metal clusters on the surface of the zirconia support.

The range of useful residence times for producing the zirconia product depends on the spray dryer design type, atmosphere used, nozzle configuration, feed liquid inlet temperature and the residual moisture content. In general, residence times for the production of the zirconia product can range from 5 seconds up to 5 minutes. According to one embodiment, the residence time is from about 15 seconds to about 45 seconds.

The range of inlet temperatures for producing the zirconia product depends on the spray dryer design type, atmosphere used, nozzle configuration, feed liquid, and energy required to perform drying and/or decomposition functions.

In general, the outlet temperature of the spray dryer determines the residual moisture content of the zirconia product. For the production of the zirconia product according to the present invention, the range of useful outlet temperatures depends on the spray dryer design type, atmosphere used, nozzle configuration, feed liquid, inlet temperature, and residual moisture content. For example, a useful outlet temperature according to one embodiment of the present invention ranges from about 200° C. to about 350° C.

Other equipment that is desirable for producing the zirconia product using a spray dryer includes a heater for the gas and a collection system. Either direct heating or indirect heating, including burning fuel, heating electrically, liquid-phase heating or steam heating, can accomplish heating of the gas. The most useful type of heating for the production of a zirconia product processed with an inlet temperature greater than 350° C. is direct fuel burning.

Many collection methods are useful for collecting powders, such as the zirconia product, produced by a spray dryer. These methods include, but are not limited to those using cyclone, bag/cartridge filter, electrostatic precipitator, and various wet collection techniques.

The powders formed in the spray processing may also be post-processed by a calcination method to convert the amorphous zirconia in the dry amorphous zirconia into the final zirconia product. The calcination method also may convert the metal precursor, if present, to its corresponding elemental metal (for example, if calcinations occurs in a reducing atmosphere), or convert the metal precursor or its corresponding elemental metal to its metal oxide state if, for example, calcination occurs in air. Of course, the post processing step preferably is carried out under conditions that are not detrimental to the structure and performance of the zirconia product. Where the post processing is a thermally-induced transformation, the temperature needs to be carefully chosen to effect the chemical change, without inducing significant sintering or significantly altering the performance of the material. A number of methods can be used to effect this thermal transformation including heat treatment in a static bed or a moving bed.

In one embodiment, the calcination step comprises heating the dry amorphous zirconia to a temperature of from about 100° C. to about 950° C., e.g., from about 600° C. to about 900° C. or from about 650° C. to about 800° C., for a period of time from about 1 to about 100 hours, e.g., from about 1 to about 24 hours or from about 1 to about 5 hours.

One preferred embodiment of the post-processing in a moving bed is the use of a rotary calciner in which the powder is delivered to a furnace which contains a rotating reactor tube such that the bed of particles is constantly moving to avoid particle to particle agglomeration and also provide a fresh exposure of the surface of the particle bed to allow outgassing of the material. This continual "agitation" of the powder bed avoids depth-dependant variations in the sample that can occur with a fixed bed reactor.

The powder batch produced by spray processing according to one embodiment of the invention includes substantially spherical aggregates of smaller particles. One non-limiting example of a substantially spherical aggregate according to this embodiment is illustrated in FIG. 1. The spherical aggregates may have different sizes and spread of size distribution that can be controlled by the spray processing manufacturing process. The microstructure of the aggregates is also controlled by the spray processing to control the surface area, crystallinity, size and porosity within each aggregate. The aggregate microstructure, average size and spread of the size distribution are controlled to provide the optimum performance in a given application depending on the operating parameters.

Spray processing enables control over the zirconia powder batch characteristics in the following manner. The particle size and spread of the particle size distribution is controlled by controlling the size and size distribution of the droplets produced by the droplet generator because each individual droplet becomes an individual particle. The size and size distribution of the particles in the powder batch is controlled independent of the chemical composition of the powder. Furthermore, the microstructure, composition and crystallinity of the particles and the sub-particles that comprise the primary particles are controlled by the nature of the precursors that are used to produce the droplets and the processing parameters (especially the temperature/time history) of the particles in the gas phase during spray processing. As a result, the powder batch produced by spray processing can have a controlled microstructure at a number of different length scales. The size and size distribution of the particles produced by spray processing can be varied to control the pore size and size distribution between the aggregates (inter-aggregate porosity).

According to one embodiment of the present invention, the porosity of the zirconia product batch is controlled at the microporosity, mesoporosity and macroporosity scales to reduce the loss of surface area and pore volume and maintain a high activity. In one embodiment of the present invention, the aggregate particles formed by the spray processing method have controllable inter-aggregate porosity (i.e., porosity between the aggregates) as well as intra-aggregate porosity (i.e., porosity within the aggregates). It would normally be expected that the inter-aggregate pores (micron size) are larger than the intra-aggregate pores (nanometer size).

In one aspect of the invention, the process further comprises the step of shaping the final zirconia product into a derivative product in order to provide a zirconia composition having suitable properties for the desired application. As used herein, the term "derivative product" means a product form that is different from the form of the final zirconia product. For example, the final zirconia product optionally is in the form of a powder of microparticles, each particle comprising tetragonal zirconia. This powder may then be processed by one or more microparticle processing techniques to form a derivative product having a non-powder form, or a powder form that is substantially different from the powder form of the final zirconia product. Optionally, the derivative product is selected from the group consisting of a pellet, an extrudate, a monolith, a thin film and a coating layer. These derivative products can be made through the formation of paste with the binding materials such as alumina, silica and other oxides, then shaped into the desired form through the processes such as spray drying for pellet, screw extrusion for extrudate, monolith, pressing for thin film and washing coating for a coating layer.

In another aspect, the process of the invention further comprises the step of fabricating a supporting anode in a solid oxide fuel cell (SOFC). In this aspect, the supporting anode comprises the final zirconia product. The supporting anode preferably further comprises nickel supported on the final zirconia product. Additionally, the final zirconia in this aspect optionally is yttria-stabilized. The electrode assemblies and the various fuel cell applications of the final zirconia product are discussed in more detail below.

C. The Zirconia-Containing Composition

In another embodiment, the present invention is directed to novel zirconia-containing compositions that may be formed by any of the above-described processes.

The zirconia-containing composition of the present invention comprises high surface area tetragonal zirconia. Preferably, the zirconia-containing composition has an average surface area greater than about 50 $m^2/g$, e.g., greater than about 80 $m^2/g$, greater than about 100 $m^2/g$, or greater than about 150 $m^2/g$. In terms of ranges, the zirconia-containing composition preferably has an average surface area of from about 50 $m^2/g$ to about 250 $m^2/g$, e.g., from about 80 $m^2/g$ to about 200 $m^2/g$ or from about 100 $m^2/g$ to about 180 $m^2/g$. As used herein, the average surface area of the zirconia-containing composition is determined by BET $N_2$ adsorption methods. It has now been discovered that such high surface area tetragonal zirconia-containing compositions may be formed by the processes of the present invention.

Additionally, the morphology and size characteristics of the zirconia-containing composition of the present invention may vary widely depending on the desired application for the zirconia-containing composition and the specific process parameters implemented in forming the zirconia-containing composition. Optionally, the zirconia-containing composition is in the form of one or more particles comprising high surface area tetragonal zirconia. If the zirconia-containing composition comprises a single particle, that particle preferably has a particle size of less than about 40 μm, e.g., less than about 20 μm or less than about 10 μm. In terms of ranges, the size of the single particle preferably ranges from about 1 to about 20 μm, e.g., from about 1 to about 15 μm or from about 2 to about 10 μm, with from about 5 to about 7 μm being particularly preferred. In this aspect, the particle size of the single particle is determined by scanning electron microscope (SEM) techniques.

If the zirconia-containing composition comprises a plurality of particles, e.g., as a powder, the average particle size (d50 value) of the plurality of particles preferably is less than about 40 microns, e.g., less than about 20 microns or less than about 10 microns. In terms of ranges, the size of the plurality of particles preferably ranges from about 1 to about 20 μm, e.g., from about 1 to about 15 μm or from about 2 to about 10 μm. In this aspect, the average particle size of the plurality of particles is measured by laser scattering techniques using a particle size analyzer.

The morphology of the zirconia-containing composition optionally is selected from the group consisting of: spherical, hollow, rod, and platelet morphologies. Preferably, the zirconia-containing composition has a substantially spherical morphology.

In one aspect of the invention, the zirconia-containing composition (or final zirconia product) comprises a plurality of zirconia crystallites having an average crystal size of from about 1 nm to about 10 nm, e.g., from about 1 nm to about 5 nm or from about 1 nm to about 3 nm.

As indicated above, the zirconia-containing composition preferably has a very high degree of tetragonal crystallinity. Preferably, the zirconia-containing composition comprises at least about 99.9 percent tetragonal zirconia, based on the total crystalline zirconia in the zirconia-containing composition. For purposes of the present invention, the total crystalline zirconia content in the zirconia-containing composition is determined by x-ray diffraction (XRD) techniques.

For purposes of the present invention, the fraction of tetragonal phase zirconia ($V_t$) in the final zirconia product (the zirconia-containing composition) is calculated by the following equation:

$$V_t = \frac{X_t}{1.311 - 0.311 X_t} \quad (I)$$

$$X_t = \frac{I_t(101)}{I_t(101) + I_m(11\bar{1}) + I_m(111)};$$

wherein $I_t(101)$ is the intensity of tetragonal $ZrO_2$ (101);

$I_m(111)$ is the intensity of monoclinic $ZrO_2$ (111); and $I_m(11\bar{1})$ is the intensity of monoclinic $ZrO_2$ ($11\bar{1}$).

Ideally, the zirconia-containing composition comprises at least about 80 weight percent crystalline zirconia, e.g., from about 90 to about 95 weight percent or from about 90 to about 99.9 weight percent crystalline zirconia, based on the total weight of the zirconia-containing composition. As used herein, the term "crystalline zirconia" includes monoclinic phase zirconia (m—$ZrO_2$), tetragonal phase zirconia (t—$ZrO_2$), and cubic phase zirconia (c—$ZrO_2$).

Optionally, the zirconia-containing composition comprises tetragonal zirconia and a metal or metal oxide supported on an outer surface of the tetragonal zirconia. The metal may be in a form of an elemental metal, metal crystallite, metal cluster, metal oxide or a mixture thereof. In this aspect of the invention, the metal optionally comprises a precious metal or a non-precious metal. For example, the metal optionally comprises a precious metal selected from the group consisting of: platinum, silver, palladium, rhodium, gold, iridium, rhenium, osmium, alloys thereof, and mixtures thereof. In this aspect, the zirconia-containing composition optionally comprises the precious metal in an amount of from about 0.1 to about 10 weight percent, e.g., from about 0.3 to about 5 weight percent, based on the total weight of the zirconia-containing composition. Preferably, the precious metal is supported primarily on the outer surface of the tetragonal zirconia rather than being well-distributed therewithin.

Additionally or alternatively, the metal optionally comprises a non-precious metal selected from the group consisting of: cobalt, nickel, iron, copper, scandium, aluminum, neodymium, ytterbium, samarium, chromium, gadolinium and mixtures thereof. In this aspect, the zirconia-containing composition comprises the metal in an amount of from about 1 to about 50 weight percent, e.g., from about 1 to about 20 weight percent, based on the total weight of the zirconia-containing composition. Preferably, the non-precious metal is well-distributed throughout the tetragonal zirconia rather than being supported primarily on the outer surface thereof.

Additionally or alternatively, the metal optionally comprises a non-precious metal selected from the group consisting of: cerium, calcium, magnesium, yttrium, lanthanum and mixtures thereof. In this aspect, the zirconia-containing composition optionally comprises the metal in an amount of from about 1 to about 50 weight percent, e.g., from about 5 to about 20 weight percent, based on the total weight of the zirconia-containing composition. Preferably, the non-precious metal is well-distributed throughout the tetragonal zirconia rather than being supported primarily on the outer surface thereof.

Optionally, the metal supported on the tetragonal zirconia is in the form of one or more metal crystallites. Specifically, the zirconia-containing composition optionally comprises tetragonal zirconia and a plurality of metal crystallites supported on an outer surface of the tetragonal zirconia. The metal crystallites preferably have an average particle size of from about 1 nm to about 10 nm, e.g., from about 1 nm to about 5 nm or from about 1 nm to about 3 nm. In a preferred embodiment, the final zirconia product (or zirconia-containing composition) comprises a plurality of precious metal crystallites having an average crystal size of from about 1 nm to about 10 nm, e.g., from about 1 nm to about 5 nm or from about 1 to about 3 nm.

In a preferred embodiment, a weight majority of the precious metal in the zirconia-containing composition is supported on an outer surface, e.g., the exterior of the tetragonal zirconia. That is, the bulk of the metal preferably is not supported on an inner surface of the tetragonal zirconia that forms pores within the inner structure of the zirconia-containing composition. The degree of precious metal dispersion can be measured by chemical sorption techniques using $H_2$ or CO. Methods for controlling the amount of precious metal deposited on the outer surface of the tetragonal zirconia include: added the precious metal to the digested slurry; or adding the precious metal precursor into a slurry of tetragonal zirconia powder, as discussed in detail above.

Optionally, the zirconia-containing composition further comprises an additive, described in detail above. Alumina, silica, ceria, calcium oxide and mixtures thereof are particularly preferred additives in that these oxides tend to "lock in" desired properties. In one preferred aspect of the present invention, the zirconia-containing composition comprises an additive selected from the group consisting of alumina, silica, ceria, calcium oxide and mixtures thereof. In this aspect, the zirconia-containing composition optionally comprises the additive in an amount less than about 50 weight percent, e.g., less than about 20 weight percent or less than about 10 weight percent, based on the total weight of the zirconia-containing composition.

The average pore volume (porosity) of the zirconia-containing composition may vary widely depending, for example, on factors such as whether the precursor composition used to form the zirconia-containing composition included a morphology enhancing agent, the material composition, the precursor types and the operation conditions. Preferably, the zirconia-containing composition has a pore volume of greater than about 0.1 $cm^3/g$, e.g., greater than about 0.3 $cm^3/g$ or greater than about 0.6 $cm^3/g$. The pore volume of the zirconia-containing composition preferably is determined by BET $N_2$ adsorption methods.

The average pore diameter of the zirconia-containing composition also may vary widely depending, for example, on factors such as whether the precursor composition used to form the zirconia-containing composition included a morphology enhancing agent (e.g., a pore enhancing agent) and the material composition, the precursor types and the operation conditions. Preferably, the zirconia-containing composition has an average pore diameter of greater than about 5 nm, e.g., greater than about 10 nm or greater than about 15 nm. The average pore diameter of the zirconia-containing composition preferably is determined by BET $N_2$ adsorption methods.

In another aspect, as described in more detail below, the zirconia-containing composition of the present invention is in the form of a supporting anode in a SOFC. In this aspect, the zirconia-containing composition preferably further comprises nickel supported by the tetragonal zirconia.

D. Fuel Cell Applications

In a particularly preferred embodiment, the high surface area tetragonal zirconia composition of the present invention is employed in a fuel cell. Fuel cells are electrochemical devices in which the energy from a chemical reaction is converted to direct current electricity. During operation of a fuel cell, a continuous flow of fuel, e.g., hydrogen, is fed to the anode while, simultaneously, a continuous flow of an oxidant, e.g., air, is fed to the cathode. The fuel is oxidized at the anode causing a release of electrons through the agency of a catalyst. These electrons are then conducted through an external load to the cathode, where the oxidant is reduced and the electrons are consumed, again through the agency of a catalyst. The constant flow of electrons from the anode to the cathode constitutes an electrical current which can be made to do useful work.

Typically, a fuel cell includes a stack of membrane electrode assemblies (MEAs). Generally, MEA's comprise an anode, a cathode and a solid or liquid electrolyte disposed between the anode and the cathode. Different types of fuel cells are categorized by the electrolyte used in the fuel cell, the five main types being alkaline (including metal-air fuel cells), molten carbonate, phosphoric acid, solid oxide and proton exchange membrane (PEM) or solid polymer electrolyte fuel cells (PEFC).

In a solid oxide fuel cell (SOFC), electricity is generated from hydrocarbon fuels at operating temperatures ranging from about 600° C. to about 1,000° C., more preferably from about 600° C. to about 850° C. These relatively high temperatures allow for internal reforming and promote rapid kinetics. There are two main types of SOFC MEA configurations. In an electrolyte-supported cell, yttria stabilized zirconia (YSZ) membranes of greater than about 100 μm thickness support the SOFC MEA's. In an electrode-supported cell, the supporting component can either be the anode or the cathode. In the electrode-supported cell, the electrolyte has a thickness of from about 5 and about 30 μm, while the supporting electrode thickness can be from about 250 μm to about 2 mm (2,000 μm). The non-supporting electrode thickness may range from about 5 μm to about 200 μm. See, generally, E.G. & G. Technical Services, *Fuel Cell Handbook* Chpt. 7 (6th Ed. November 2002), the entirety of which is incorporated herein by reference.

The high surface area and porosity of the zirconia-containing compositions of the present invention makes them extremely suitable as supporting anodes in solid oxide fuel cells. Thus, in one aspect, the invention is to an anode-supported MEA comprising a supporting anode, a cathode, and an electrolyte (which also typically comprises yttria-stabilized zirconia) disposed between the supporting anode and the cathode. The supporting anode comprises any of the high surface area zirconia compositions of the present invention. In a preferred embodiment, the supporting anode further comprises nickel supported on the high surface area zirconia compositions of the present invention. Optionally, the high surface area zirconia that forms the supporting anode is yttria stabilized.

In another aspect, the invention is to a fuel cell, e.g., a solid oxide fuel cell. The fuel cell may be a planar fuel cell or a tubular fuel cell.

E. EXAMPLES

The present invention will be better understood in view of the following non-limiting examples.

1. Example 1

Synthesis of a-$ZrO_2$

Figure 3A:
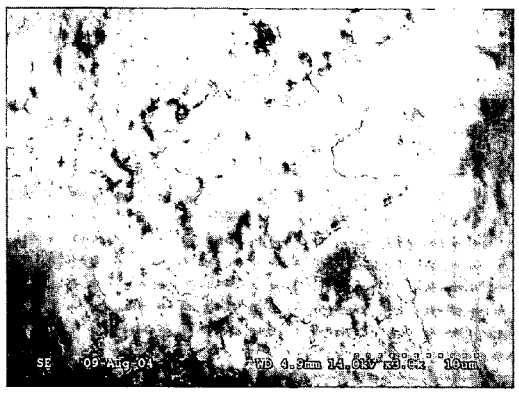
FIGS. 3A-3D present SEM's of the zirconia compositions formed in Examples 1 and 8-10, respectively.
Figure 3B:
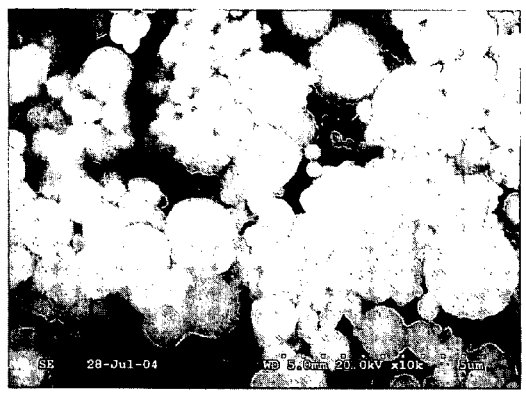
Figure 3C:
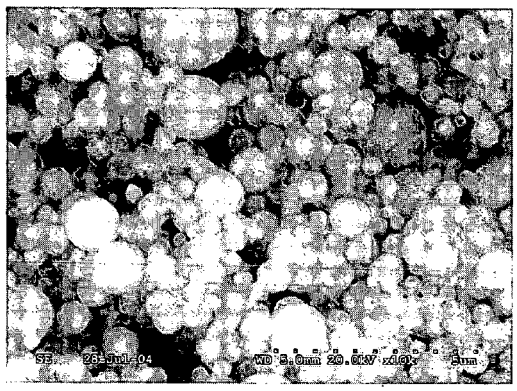
Figure 3D:
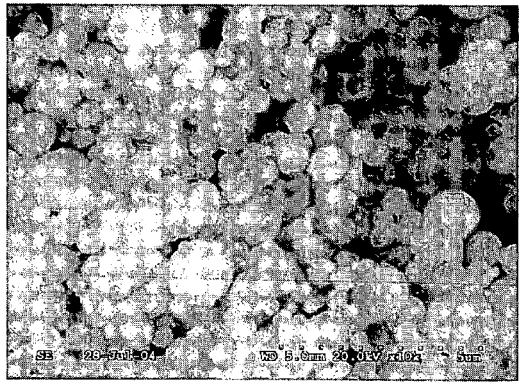

This example illustrates the production of a 20g batch of a high surface area amorphous zirconia ($ZrO_2$) composition by precipitation of a zirconyl nitrate zirconium precursor with ammonium hydroxide followed by the digestion of zirconia hydroxide. 55 g of zirconyl nitrate ($ZrO(NO_3)_2$) was dissolved in 454 ml deionized water to obtain solution A. Solution B was prepared by mixing 100 ml deionized water and 100 ml 30 wt % ammonium hydroxide ($NH_4OH$). Solution A was added dropwise into Solution B under vigorous stirring at room temperature to form a first precipitant. The pH was continuously monitored with a pH meter and found to decrease from 12 initially to about 9.8 at the end of precipitation. Solution C containing the above first precipitant, zirconia hydroxide, was then digested at a constant temperature of 96° C. for 192 hours to form high surface area amorphous zirconia. Additional 30 wt % $NH_4OH$ was added throughout digestion at a rate of 1.56 ml/hour to maintain the pH at about 9.8. The digested sample (digested slurry) was then vacuum filtered and dried overnight in a vacuum oven at 100° C. The prepared powder batch included amorphous $ZrO_2$. The surface area measured by $N_2$ BET was 373.8 m²/g. FIG. 3A presents a scanning electron micrograph of the zirconia-containing composition formed in Example 1.

2. Examples 2-7

Calcination to Form t-$ZrO_2$

In Examples 2-7, the amorphous $ZrO_2$ from Example 1 was heat treated in a furnace at 1° C./min from room temperature to 500° C. (Example 2), 600° C. (Example 3), 700° C. (Example 4), 800° C. (Example 5), 900° C. (Example 6) and 1000° C. (Example 7).

Figure 2:
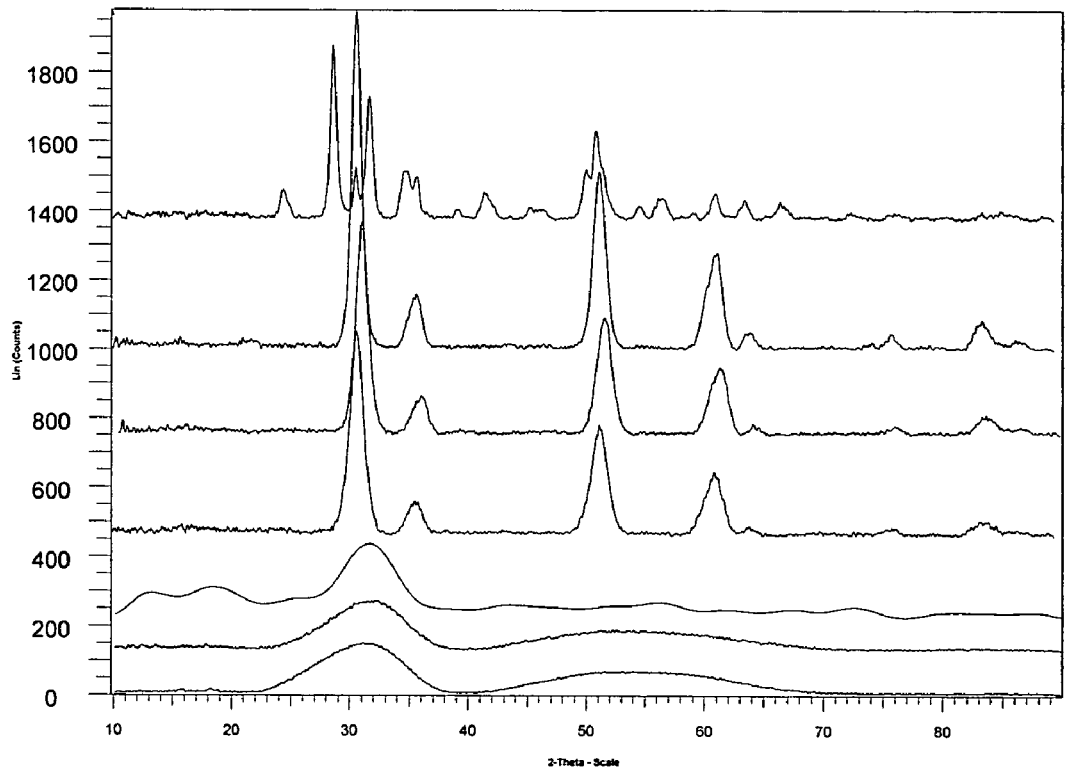
FIG. 2 presents an x-ray diffraction (XRD) graph of the zirconia compositions formed in Examples 1-7.

FIG. 2 presents XRD profiles for Examples 1-7. Example 1 is the bottom-most profile and Example 7 is the upper-most profile, and the profiles for Examples 2-6 are arranged therebetween. This figure shows broad curves for Examples 1-3 indicating that the zirconia formed in these examples comprise amorphous zirconia. In contrast, the XRD profiles for Example 4-6 show very sharp peaks at about 30, about 35, about 50 and about 60 (2-theta). These sharp peaks indicate that the zirconia compositions formed in Examples 4-6 comprise nearly 100 percent tetragonal zirconia. The zirconia composition formed in Example 7 comprised 91% m—$ZrO_2$ and 9% t—$ZrO_2$.

The surface areas for the zirconia compositions formed in Examples 2-7 were determined by BET $N_2$ adsorption methods. The surface areas for Examples 2-7 were found to be: 282.8, 245.2, 178.3, 125.6, 74.4 and 0.2 m²/g, respectively.

The average pore volumes for the zirconia compositions formed in Examples 1-7 were 0.60, 0.52, 0.48, 0.37, 0.30, 0.18 and 0.0009 cm³/g, respectively. The average pore diameters for the zirconia compositions formed in Examples 1-7 were 6.0, 7.1, 6.6, 6.8, 7.5, 7.0 and 20.5 nm, respectively. These characteristics of the zirconia compositions formed in Examples 1-7 are presented below in Table 2.

TABLE 2

PHYSICAL CHARACTERISTICS OF ZIRCONIA-CONTAINING COMPOSITIONS FORMED IN EXAMPLES 1-7

| | Calcination Temp. (° C.) | Surface Area (m²/g) | Pore Volume (cm³/g) | Pore diameter (nm) |
|---|---|---|---|---|
| Example 1 | N/A | 373.8 | 0.60 | 6.0 |
| Example 2 | 500 | 282.8 | 0.52 | 7.1 |
| Example 3 | 600 | 245.2 | 0.48 | 6.6 |
| Example 4 | 700 | 178.3 | 0.37 | 6.8 |
| Example 5 | 800 | 125.6 | 0.30 | 7.5 |
| Example 6 | 900 | 74.4 | 0.18 | 7.0 |
| Example 7 | 1000 | 0.2 | 0.0009 | 20.5 |

3. Examples 8-10

Spray Pyrolysis to Form t-$ZrO_2$

In Examples 8-10, the amorphous $ZrO_2$ formed in Example 1, before filtration and drying, was processed by spray pyrolysis to form zirconia-containing compositions having a very high surface area and a substantially spherical morphology. The spray pyrolysis was carried out at furnace temperatures of 500° C., 600° C. and 700° C., respectively. FIGS. 3A-3D present scanning electron micrographs of the zirconia-containing compositions formed in Examples 1 and 8-10, respectively.

The surface areas for the zirconia compositions formed in Examples 9 and 10 were 163.8 and 223.5 m²/g, respectively. The average pore volumes for the zirconia compositions formed in Examples 9 and 10 were 0.27 and 0.34 cm³/g. The average pore diameters for the zirconia compositions formed in Examples 9 and 10 were 6.2 and 6.0 nm. These characteristics of the zirconia compositions formed in Examples 1, 9 and 10 are presented below in Table 3.

TABLE 3

PHYSICAL CHARACTERISTICS OF ZIRCONIA-CONTAINING COMPOSITIONS FORMED IN EXAMPLES 1, 9 AND 10

| | Pyrolysis Temp. (° C.) | Surface Area (m²/g) | Pore Volume (cm³/g) | Pore diameter (nm) |
|---|---|---|---|---|
| Example 1 | N/A | 373.8 | 0.60 | 6.0 |
| Example 9 | 600 | 163.8 | 0.27 | 6.2 |
| Example 10 | 700 | 223.5 | 0.34 | 6.0 |

Having now fully described the invention, it will be appreciated by those skilled in the art that the invention may be performed within a wide range of the parameters within what is claimed, without departing from the spirit and scope of the invention.

We claim:

1. A calcined zirconia-containing composition, comprising:
   (a) at least about 99.9 percent tetragonal zirconia, based on the total crystalline zirconia in the zirconia-containing composition as determined by XRD, wherein the calcined zirconia-containing composition has a substantially spherical morphology; and
   (b) a plurality of metal crystallites supported on the tetragonal zirconia having an average particle crystallite size of from about 1 nm to about 3 nm, wherein the calcined zirconia-containing composition has an average surface area of at least 150 m²/g, after calcination at a temperature from about 600° C. to about 900° C.

2. The calcined zirconia-containing composition of claim 1, wherein the metal crystallites supported on the tetragonal zirconia comprise a metal oxide.

3. The calcined zirconia-containing composition of claim 2, wherein the metal oxide comprises a metal selected from the group consisting of cerium, calcium, magnesium, yttrium, lanthanum and mixtures thereof.

4. The calcined zirconia-containing composition of claim 1, wherein the metal crystallites supported on the tetragonal zirconia are in an amount of from about 1 to about 50 weight percent, based on the total weight of the zirconia-containing composition.

5. The calcined zirconia-containing composition of claim 4, wherein the metal crystallites supported on the tetragonal zirconia are in an amount of from about 5 to about 20 weight percent, based on the total weight of the zirconia-containing composition.

6. The calcined zirconia-containing composition of claim 1, wherein the zirconia-containing composition further comprises:
   (c) an additive selected from the group consisting of alumina, silica, ceria, calcium oxide and mixtures thereof.

7. The calcined zirconia-containing composition of claim 6, wherein the zirconia-containing composition comprises the additive in an amount less than about 50 weight percent, based on the total weight of the zirconia-containing composition.

8. The calcined zirconia-containing composition of claim 7, wherein the zirconia-containing composition comprises the additive in an amount less than about 20 weight percent, based on the total weight of the zirconia-containing composition.

9. The calcined zirconia-containing composition of claim 8, wherein the zirconia-containing composition comprises the additive in an amount less than about 10 weight percent, based on the total weight of the zirconia-containing composition.

10. The calcined zirconia-containing composition of claim 1, wherein the zirconia-containing composition has a pore volume greater than 0.1 cm$^3$/g.

11. The calcined zirconia-containing composition of claim 1, wherein the zirconia-containing composition has a pore volume greater than 0.3 cm$^3$/g.

12. The calcined zirconia-containing composition of claim 1, wherein the zirconia-containing composition has a pore volume greater than 0.6 cm$^3$/g.

13. The calcined zirconia-containing composition of claim 1, further comprising less than 100 wppm chlorine, based on the total weight of the calcined zirconia-containing composition.

* * * * *